US008666603B2

(12) United States Patent
Morris

(10) Patent No.: US 8,666,603 B2
(45) Date of Patent: Mar. 4, 2014

(54) METHODS, SYSTEMS, AND COMPUTER PROGRAM PRODUCTS FOR PROVIDING STEERING-CONTROL FEEDBACK TO AN OPERATOR OF AN AUTOMOTIVE VEHICLE

(75) Inventor: Robert Paul Morris, Raleigh, NC (US)

(73) Assignee: Sitting Man, LLC, Raleigh, NC (US)

( * ) Notice: Subject to any disclaimer, the term of this patent is extended or adjusted under 35 U.S.C. 154(b) by 401 days.

(21) Appl. No.: 13/025,939

(22) Filed: Feb. 11, 2011

(65) Prior Publication Data

US 2012/0209474 A1    Aug. 16, 2012

(51) Int. Cl.
*B62D 6/00*    (2006.01)

(52) U.S. Cl.
USPC ............................................ 701/42; 180/421

(58) Field of Classification Search
USPC ......... 701/36, 41–44; 180/413, 414, 421, 422
See application file for complete search history.

(56) References Cited

U.S. PATENT DOCUMENTS

| | | | |
|---|---|---|---|
| 4,275,378 A | 6/1981 | Henderson | |
| 4,500,868 A | 2/1985 | Tokitsu et al. | |
| 4,716,458 A | 12/1987 | Heitzman et al. | |
| 4,933,852 A | 6/1990 | Lemelson | |
| 4,945,759 A | 8/1990 | Krofchalk et al. | |
| 5,034,894 A | 7/1991 | Abe | |
| 5,074,144 A | 12/1991 | Krofchalk et al. | |
| 5,150,609 A | 9/1992 | Ebner et al. | |
| 5,207,095 A | 5/1993 | Teare et al. | |
| 5,390,117 A | 2/1995 | Graf et al. | |
| 5,465,079 A | 11/1995 | Bouchard et al. | |
| 5,499,182 A | 3/1996 | Ousborne | |
| 5,661,454 A | 8/1997 | Bezard | |
| 5,769,085 A | 6/1998 | Kawakami et al. | |
| 5,850,176 A | 12/1998 | Kinoshita | |
| 6,025,775 A | 2/2000 | Erlandson | |
| 6,249,720 B1 | 6/2001 | Kubota et al. | |
| 6,268,803 B1 | 7/2001 | Gunderson et al. | |
| 6,272,411 B1 | 8/2001 | Corrado et al. | |
| 6,285,930 B1 | 9/2001 | Dickson et al. | |
| 6,306,063 B1 | 10/2001 | Horgan et al. | |
| 6,356,812 B1 | 3/2002 | Cragun | |
| 6,370,454 B1 | 4/2002 | Moore | |

(Continued)

FOREIGN PATENT DOCUMENTS

| | | |
|---|---|---|
| EP | 0 825 568 | 2/1998 |
| JP | 01195139 | 8/1989 |

(Continued)

OTHER PUBLICATIONS

Ford, "Ford Technology Newsbrief Aug. 2010."

(Continued)

*Primary Examiner* — Richard Camby
(74) *Attorney, Agent, or Firm* — Patrick E. Caldwell, Esq.; The Caldwell Firm, LLC

(57) ABSTRACT

Methods and systems are described for providing steering-control feedback to an operator of an automotive vehicle. First attribute information is received that identifies a first attribute of a first operator coupling of an operator, of an automotive vehicle, to a steering-control mechanism of the automotive vehicle. A specified steering-control criterion is detected as met based on the first attribute. Feedback information is identified based on the steering-control criterion. In response to the detecting, the feedback information is sent to present, via an output device, a feedback indicator to the operator.

37 Claims, 7 Drawing Sheets

(56) References Cited

U.S. PATENT DOCUMENTS

| | | | |
|---|---|---|---|
| 6,496,117 | B2 | 12/2002 | Gutta |
| 6,564,127 | B1 | 5/2003 | Bauerle et al. |
| 6,724,538 | B2 | 4/2004 | Kushida |
| 6,909,947 | B2 | 6/2005 | Douros et al. |
| 6,927,694 | B1 | 8/2005 | Smith |
| 7,027,621 | B1 | 4/2006 | Prokoski |
| 7,138,922 | B2 | 11/2006 | Strumolo et al. |
| 7,174,248 | B2 | 2/2007 | Suzuki |
| 7,260,458 | B2 | 8/2007 | Kato |
| 7,403,124 | B2 | 7/2008 | Arakawa |
| 7,427,913 | B2 | 9/2008 | Maron |
| 7,528,731 | B2 | 5/2009 | Zhang |
| 7,598,927 | B2 | 10/2009 | Yamazaki |
| 7,705,738 | B2 | 4/2010 | Fukaya |
| 7,710,243 | B2 | 5/2010 | Akatsuka |
| 7,859,413 | B2 | 12/2010 | Nguyen |
| 8,022,831 | B1 | 9/2011 | Wood-Eyre |
| 8,068,968 | B2 * | 11/2011 | Kondoh .................... 701/96 |
| 8,075,484 | B2 | 12/2011 | Moore-Ede |
| 8,519,853 | B2 | 8/2013 | Eskandarian et al. |
| 2001/0056544 | A1 | 12/2001 | Walker |
| 2002/0032510 | A1 | 3/2002 | Turnbull et al. |
| 2002/0103622 | A1 | 8/2002 | Burge |
| 2003/0014176 | A1 | 1/2003 | Levine |
| 2005/0255874 | A1 | 11/2005 | Stewart-Baxter |
| 2008/0080741 | A1 | 4/2008 | Yokoo |
| 2008/0266552 | A1 | 10/2008 | Malawey |
| 2009/0271002 | A1 | 10/2009 | Asofsky |
| 2010/0156617 | A1 | 6/2010 | Nakada |
| 2010/0198491 | A1 | 8/2010 | Mays |

FOREIGN PATENT DOCUMENTS

| | | |
|---|---|---|
| JP | 10-313359 | 11/1998 |
| WO | WO 92/03803 | 3/1992 |
| WO | WO 00/07150 | 2/2000 |
| WO | WO 00/31712 | 6/2000 |
| WO | WO 00/34742 | 6/2000 |
| WO | WO 00/55000 | 9/2000 |

OTHER PUBLICATIONS

Daimler, "Attention Assist: Drowsiness-detection system warns drivers to prevent them falling asleep momentarily," Nov. 12, 2008, http://media.daimler.com/dcmedia/0-921-658892-1-1147698-1-0-0-1147922-0-1-11702-0-0-1-0-0-0-0-0.html?TS=1266506682902, last accessed Nov. 26, 2013.

VW, "Driver Alert," http://www.volkswagen.co.uk/new/passat-vii/explore/experience/driver-assistance/driver-alert, last accessed Nov. 26, 2013.

How stuff works, "Will your next car wake you up when you fall asleep at the wheel?," Dec. 9, 2009, http://web.archive.org/web/20091206040143/http:/auto.howstuffworks.com/car-driving-safety/safety-regulatory-devices/car-wake-you-up1.htm, last accessed Nov. 26, 2013.

www.newcarnet.co.uk, "LS460 achieves a world-first in preventative safety," Aug. 30, 2006, http://web.archive.org/web/20101006054727/http:/www.newcarnet.co.uk/Lexus_news.html?id,5787, last accessed Nov. 26, 2013.

www.worldcarfans.com, "Toyota Redesigns Crown & Introduces Hybrid Model," Feb. 19, 2008, http://www.worldcarfans.com/10802192219/toyota-redesigns-crown--introduces-hybrid-model, last accessed Nov. 26, 2013.

* cited by examiner

METHODS, SYSTEMS, AND COMPUTER PROGRAM PRODUCTS FOR PROVIDING STEERING-CONTROL FEEDBACK TO AN OPERATOR OF AN AUTOMOTIVE VEHICLE

RELATED APPLICATIONS

This application is related to the following commonly owned U.S. patent applications, the entire disclosures being incorporated by reference herein: application Ser. No. 13/023,883 filed on 2011 Feb. 9, entitled "Methods, Systems, and Program Products for Directing Attention of an Occupant of an Automotive Vehicle to a Viewport";

Application Ser. No. 13/023,916 filed on 2011 Feb. 9, entitled "Methods, Systems, and Program Products for Directing Attention to a Sequence of Viewports of an Automotive Vehicle";

Application Ser. No. 13/025,944 filed on 2011 Feb. 11, entitled "Methods, Systems, and Program Products for Managing Attention of a User of Portable Electronic Device";

Application Ser. No. 13/024,444 filed on 2011 Feb. 10, entitled "Methods, Systems, and Program Products for Managing Operation of a Portable Electronic Device";

Application Ser. No. 13/023,932 filed on 2011 Feb. 9, entitled "Methods, Systems, and Program Products for Altering Attention of an Automotive Vehicle Operator";

Application Ser. No. 13/023,952 filed on 2011 Feb. 9, entitled "Methods, Systems, and Program Products for Managing Attention of an Operator of an Automotive Vehicle"; and Application Ser. No. 13/024,466 filed on 2011 Feb. 10, entitled "Methods, Systems, and Program Products for Managing Operation of an Automotive Vehicle".

BACKGROUND

Driving while distracted is a significant cause of highway accidents. Recent attention to the dangers of driving while talking on a phone and/or driving while "texting" have brought the public's attention to this problem. While the awareness is newly heightened, the problem is quite old. Driving while eating, adjusting a car's audio system, and even talking to other passengers can and does take drivers' attention away from driving, thus creating and/or otherwise increasing risks.

While inattention to what is in front of a car while driving is clearly a risk, many drivers even when not distracted by electronic devices, food, and other people pay little attention to driving related information provided by mirrors, instrument panels, cameras, and steering wheels.

A need exists to assist drivers in focusing their attention where it is needed to increase highway safety. Accordingly, there exists a need for methods, systems, and computer program products for providing steering-control feedback to an operator of an automotive vehicle.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and systems are described for providing steering-control feedback to an operator of an automotive vehicle. In one aspect, the method includes receiving first attribute information identifying a first attribute of a first operator coupling of an operator, of an automotive vehicle, to a steering-control mechanism of the automotive vehicle. The method further includes detecting that a specified steering-control criterion is met based on the first attribute. The method still further includes identifying feedback information, based on the steering-control criterion. The method also includes sending, in response to the detecting, the feedback information to present, via an output device, a feedback indicator to the operator.

Further, a system for providing steering-control feedback to an operator of an automotive vehicle is described. The system includes an operator-control monitor component, an operator-control condition component, a steering-control feedback component, and a feedback director component adapted for operation in an execution environment. The system includes the operator-control monitor component configured for receiving first attribute information identifying a first attribute of a first operator coupling of an operator, of an automotive vehicle, to a steering-control mechanism of the automotive vehicle. The system further includes the operator-control condition component configured for detecting that a specified steering-control criterion is met based on the first attribute. The system still further includes the steering-control feedback component configured for identifying feedback information, based on the steering-control criterion. The system still further includes the feedback director component configured for sending, in response to the detecting, the feedback information to present, via an output device, a feedback indicator to the operator.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Figure 1:
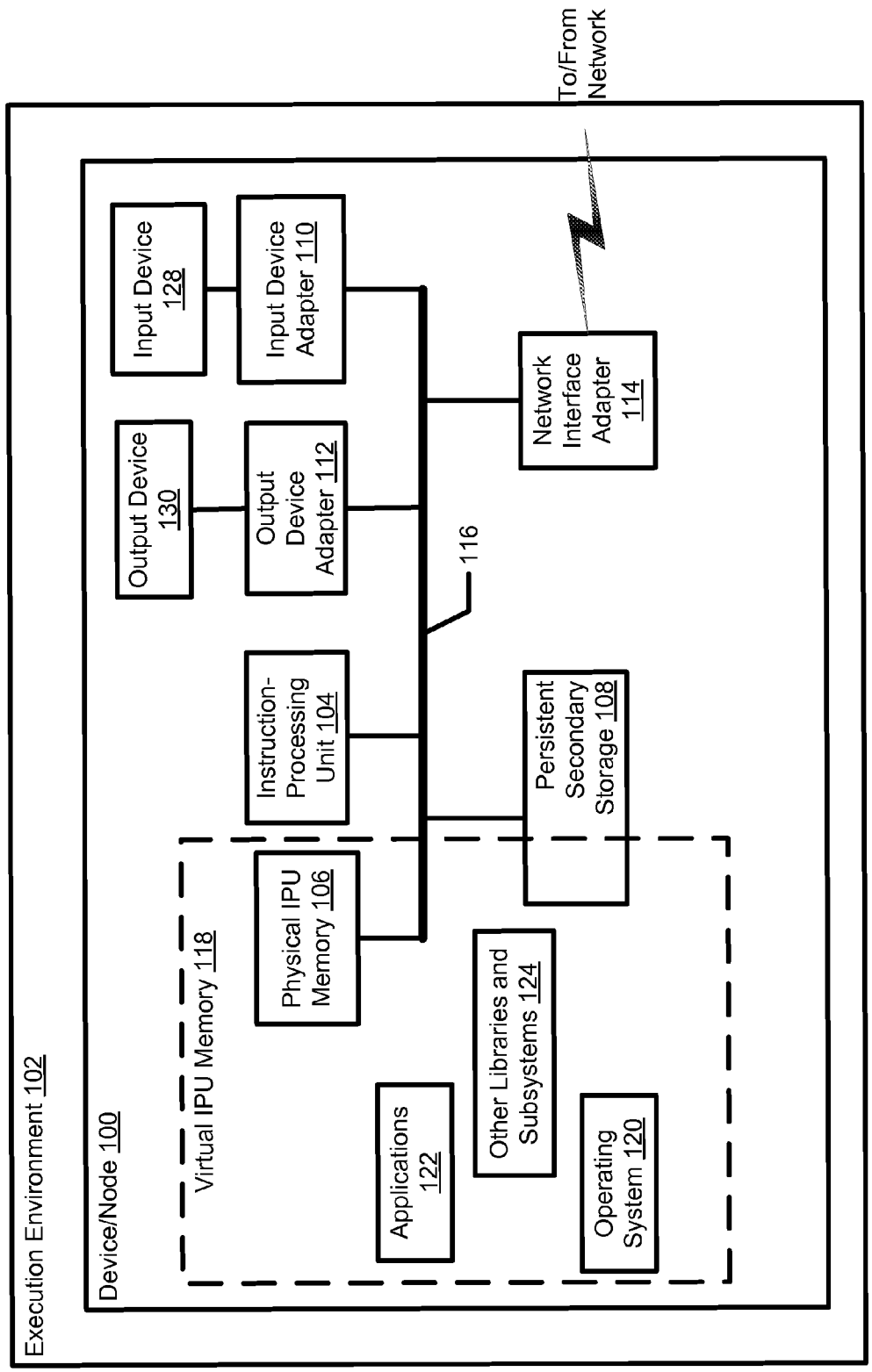
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure.

An exemplary device included in an execution environment that may be configured according to the subject matter is illustrated in FIG. 1. An execution environment includes an arrangement of hardware and, in some aspects, software that may be further configured to include an arrangement of components for performing a method of the subject matter described herein. An execution environment includes and/or is otherwise provided by one or more devices. An execution environment may include a virtual execution environment including software components operating in a host execution environment. Exemplary devices included in and/or otherwise providing suitable execution environments for configuring according to the subject matter include an automobile, a truck, a van, and/or sports utility vehicle. Alternatively or additionally a suitable execution environment may include and/or may be included in a personal computer, a notebook computer, a tablet computer, a server, a portable electronic device, a handheld electronic device, a mobile device, a multiprocessor device, a distributed system, a consumer electronic device, a router, a communication server, and/or any other suitable device. Those skilled in the art will understand that the components illustrated in FIG. 1 are exemplary and may vary by particular execution environment.

FIG. 1 illustrates hardware device 100 included in execution environment 102. FIG. 1 illustrates that execution environment 102 includes instruction-processing unit (IPU) 104, such as one or more microprocessors; physical IPU memory 106 including storage locations identified by addresses in a physical memory address space of IPU 104; persistent secondary storage 108, such as one or more hard drives and/or flash storage media; input device adapter 110, such as a key or keypad hardware, a keyboard adapter, and/or a mouse adapter; output device adapter 112, such as a display and/or an audio adapter for presenting information to a user; a network interface component, illustrated by network interface adapter 114, for communicating via a network such as a LAN and/or WAN; and a communication mechanism that couples elements 104-114, illustrated as bus 116. Elements 104-114 may be operatively coupled by various means. Bus 116 may comprise any type of bus architecture, including a memory bus, a peripheral bus, a local bus, and/or a switching fabric.

IPU 104 is an instruction execution machine, apparatus, or device. Exemplary IPUs include one or more microprocessors, digital signal processors (DSPs), graphics processing units, application-specific integrated circuits (ASICs), and/or field programmable gate arrays (FPGAs). In the description of the subject matter herein, the terms "IPU" and "processor" are used interchangeably. IPU 104 may access machine code instructions and data via one or more memory address spaces in addition to the physical memory address space. A memory address space includes addresses identifying locations in a processor memory. The addresses in a memory address space are included in defining a processor memory. IPU 104 may have more than one processor memory. Thus, IPU 104 may have more than one memory address space. IPU 104 may access a location in a processor memory by processing an address identifying the location. The processed address may be identified by an operand of a machine code instruction and/or may be identified by a register or other portion of IPU 104.

FIG. 1 illustrates virtual IPU memory 118 spanning at least part of physical IPU memory 106 and at least part of persistent secondary storage 108. Virtual memory addresses in a memory address space may be mapped to physical memory addresses identifying locations in physical IPU memory 106. An address space for identifying locations in a virtual processor memory is referred to as a virtual memory address space; its addresses are referred to as virtual memory addresses; and its IPU memory is referred to as a virtual IPU memory or virtual memory. The terms "IPU memory" and "processor memory" are used interchangeably herein. Processor memory may refer to physical processor memory, such as IPU memory 106, and/or may refer to virtual processor memory, such as virtual IPU memory 118, depending on the context in which the term is used.

Physical IPU memory 106 may include various types of memory technologies. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), RAMBUS DRAM (RDRAM), and/or XDR™ DRAM. Physical IPU memory 106 may include volatile memory as illustrated in the previous sentence and/or may include nonvolatile memory such as nonvolatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include a removable medium. The drives and their associated computer-readable storage media provide volatile and/or nonvolatile storage for computer-readable instructions, data structures, program components, and other data for execution environment 102.

Execution environment 102 may include software components stored in persistent secondary storage 108, in remote storage accessible via a network, and/or in a processor memory. FIG. 1 illustrates execution environment 102 including operating system 120, one or more applications 122, and other program code and/or data components illustrated by other libraries and subsystems 124. In an aspect, some or all software components may be stored in locations accessible to IPU 104 in a shared memory address space shared by the software components. The software components accessed via the shared memory address space are stored in a shared processor memory defined by the shared memory address space. In another aspect, a first software component may be stored in one or more locations accessed by IPU 104 in a first address space and a second software component may be stored in one or more locations accessed by IPU 104 in a second address space. The first software component is stored in a first processor memory defined by the first address space and the second software component is stored in a second processor memory defined by the second address space.

Software components typically include instructions executed by IPU 104 in a computing context referred to as a "process". A process may include one or more "threads". A "thread" includes a sequence of instructions executed by IPU 104 in a computing sub-context of a process. The terms "thread" and "process" may be used interchangeably herein when a process includes only one thread.

Execution environment 102 may receive user-provided information via one or more input devices illustrated by input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by IPU 104, physical IPU memory 106, and/or other components included in execution environment 102.

Output device 130 in FIG. 1 exemplifies one or more output devices that may be included in and/or that may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user. Sensory information detected by a user is referred to as "sensory input" with respect to the user.

A device included in and/or otherwise providing an execution environment may operate in a networked environment communicating with one or more devices via one or more network interface components. The terms "communication interface component" and "network interface component" are used interchangeably herein. FIG. 1 illustrates network interface adapter (NIA) 114 as a network interface component included in execution environment 102 to operatively couple device 100 to a network. A network interface component includes a network interface hardware (NIH) component and optionally a software component.

Exemplary network interface components include network interface controller components, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The terms "network node" and "node" in this document both refer to a device having a network interface component for operatively coupling the device to a network. Further, the terms "device" and "node" used herein refer to one or more devices and nodes, respectively, providing and/or otherwise included in an execution environment unless clearly indicated otherwise.

The user-detectable outputs of a user interface are generically referred to herein as "user interface elements". More specifically, visual outputs of a user interface are referred to herein as "visual interface elements". A visual interface element may be a visual output of a graphical user interface (GUI). Exemplary visual interface elements include windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes and radio buttons. An application interface may include one or more of the elements listed. Those skilled in the art will understand that this list is not exhaustive. The terms "visual representation", "visual output", and "visual interface element" are used interchangeably in this document. Other types of user interface elements include audio outputs referred to as "audio interface elements", tactile outputs referred to as "tactile interface elements", and the like.

A visual output may be presented in a two-dimensional presentation where a location may be defined in a two-dimensional space having a vertical dimension and a horizontal dimension. A location in a horizontal dimension may be referenced according to an X-axis and a location in a vertical dimension may be referenced according to a Y-axis. In another aspect, a visual output may be presented in a three-dimensional presentation where a location may be defined in a three-dimensional space having a depth dimension in addition to a vertical dimension and a horizontal dimension. A location in a depth dimension may be identified according to a Z-axis. A visual output in a two-dimensional presentation may be presented as if a depth dimension existed allowing the visual output to overlie and/or underlie some or all of another visual output.

An order of visual outputs in a depth dimension is herein referred to as a "Z-order". The term "Z-value" as used herein refers to a location in a Z-order. A Z-order specifies the front-to-back and/or back-to-front ordering of visual outputs in a presentation space with respect to a Z-axis. In one aspect, a visual output with a higher Z-value than another visual output may be defined to be on top of or closer to the front than the other visual output.

A "user interface (UI) element handler" component, as the term is used in this document, includes a component configured to send information representing a program entity for presenting a user-detectable representation of the program entity by an output device, such as a display. A "program entity" is an object included in and/or otherwise processed by an application or executable. The user-detectable representation is presented based on the sent information. Information that represents a program entity for presenting a user detectable representation of the program entity by an output device is referred to herein as "presentation information". Presentation information may include and/or may otherwise identify data in one or more formats. Exemplary formats include image formats such as JPEG, video formats such as MP4, markup language data such as hypertext markup language (HTML) and other XML-based markup, a bit map, and/or instructions such as those defined by various script languages, byte code, and/or machine code. For example, a web page received by a browser from a remote application provider may include HTML, ECMAScript, and/or byte code for presenting one or more user interface elements included in a user interface of the remote application. Components configured to send information representing one or more program entities for presenting particular types of output by particular types of output devices include visual interface element handler components, audio interface element handler components, tactile interface element handler components, and the like.

A representation of a program entity may be stored and/or otherwise maintained in a presentation space. As used in this document, the term "presentation space" refers to a storage region allocated and/or otherwise provided for storing presentation information, which may include audio, visual, tactile, and/or other data for presentation by and/or on an output device as sensory information for a user. For example, a buffer for storing an image and/or text string may be a presentation space. A presentation space may be physically and/or logically contiguous or non-contiguous. A presentation space may have a virtual as well as a physical representation. A presentation space may include a storage location in a processor memory, secondary storage, a memory of an output adapter device, and/or a storage medium of an output device. A screen of a display, for example, is a presentation space.

As used herein, the term "program" or "executable" refers to any data representation that may be translated into a set of machine code instructions and optionally into associated program data. Thus, a program or executable may include an application, a shared or non-shared library, and/or a system command. Program representations other than machine code include object code, byte code, and source code. Object code includes a set of instructions and/or data elements that either are prepared for linking prior to loading or are loaded into an execution environment. When in an execution environment, object code may include references resolved by a linker and/or may include one or more unresolved references. The context in which this term is used will make clear the state of the object code when it is relevant. This definition can include machine code and virtual machine code, such as Java™ byte code.

Figure 2:
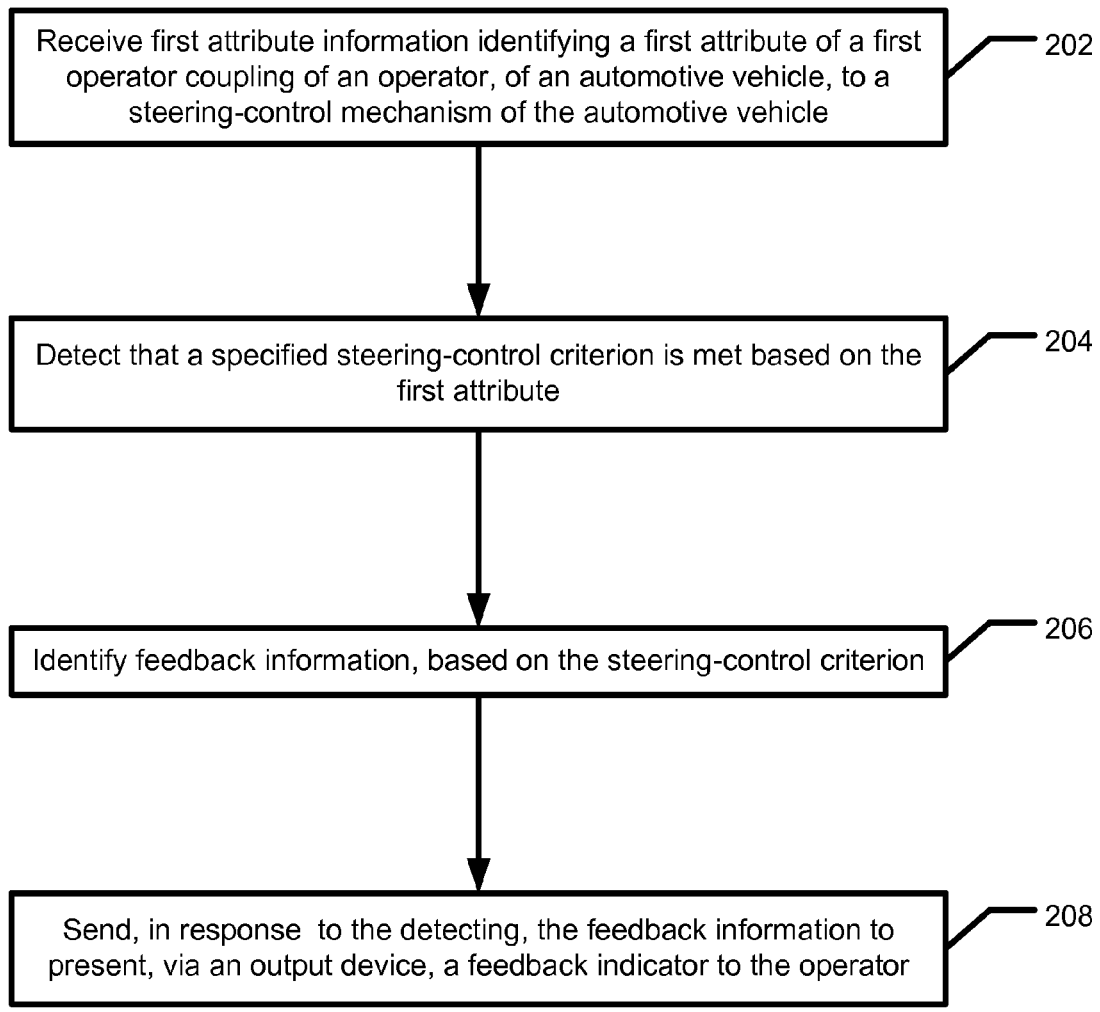
FIG. 2 is a flow diagram illustrating a method for providing steering-control feedback to an operator of an automotive vehicle according to an aspect of the subject matter described herein.
Figure 3:
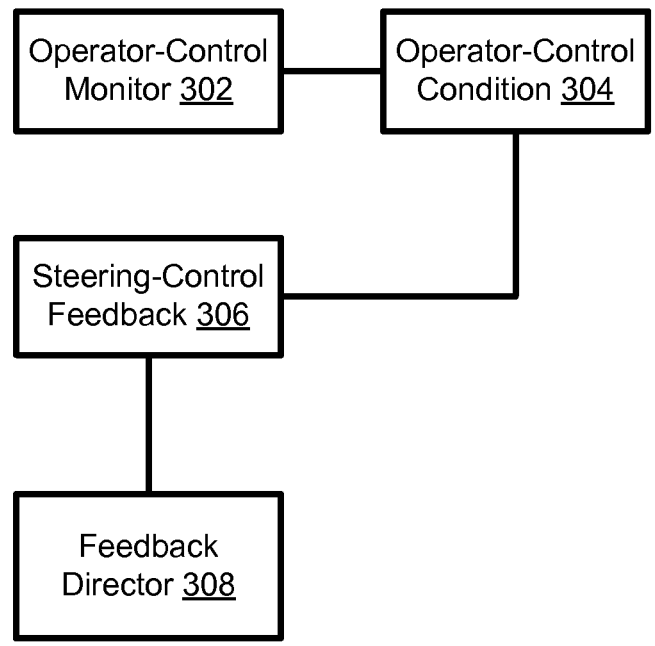
FIG. 3 is a block diagram illustrating an arrangement of components for providing steering-control feedback to an operator of an automotive vehicle according to another aspect of the subject matter described herein.
Figure 4A:
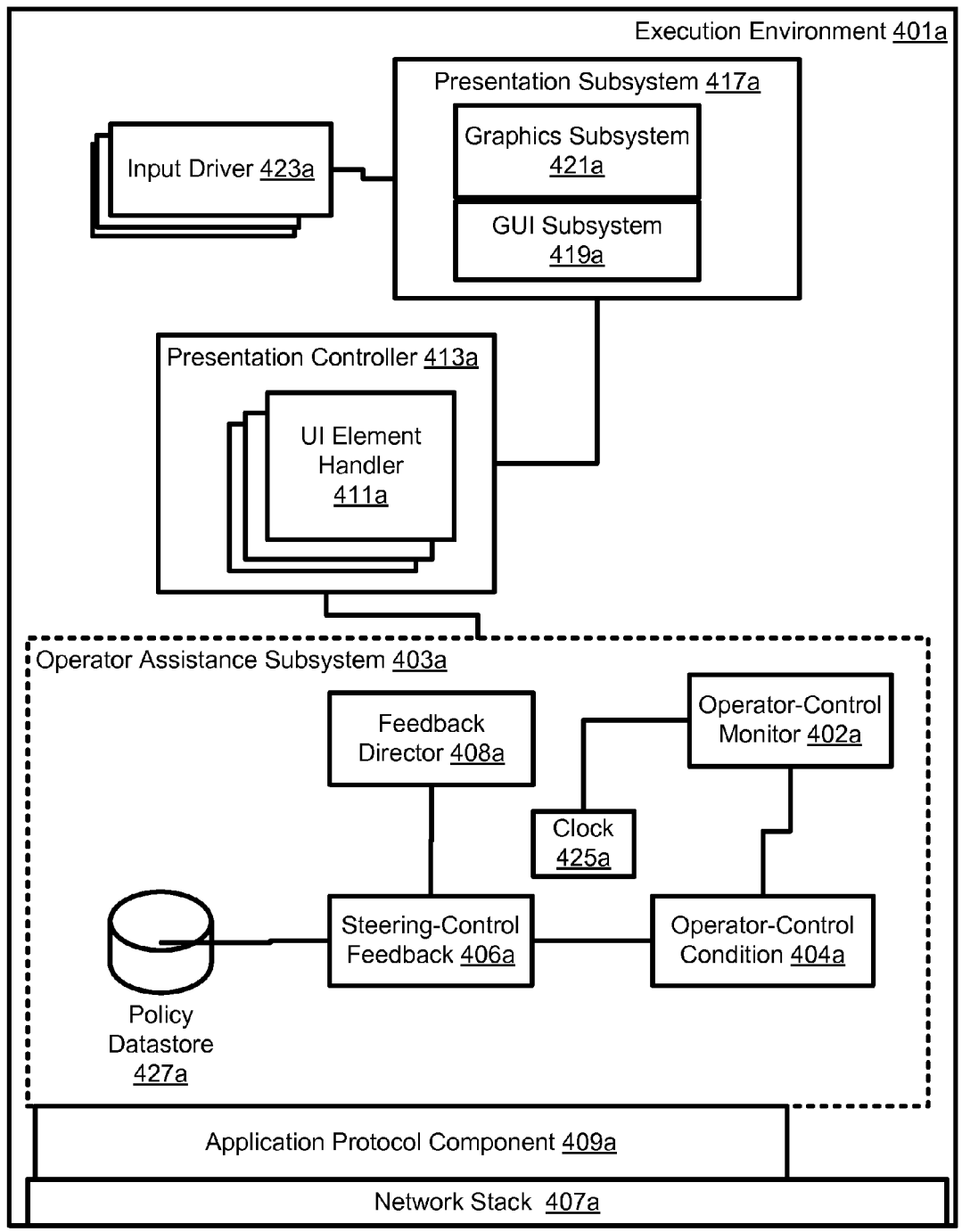
FIG. 4a is a block diagram illustrating an arrangement of components for providing steering-control feedback to an operator of an automotive vehicle according to another aspect of the subject matter described herein.
Figure 4B:
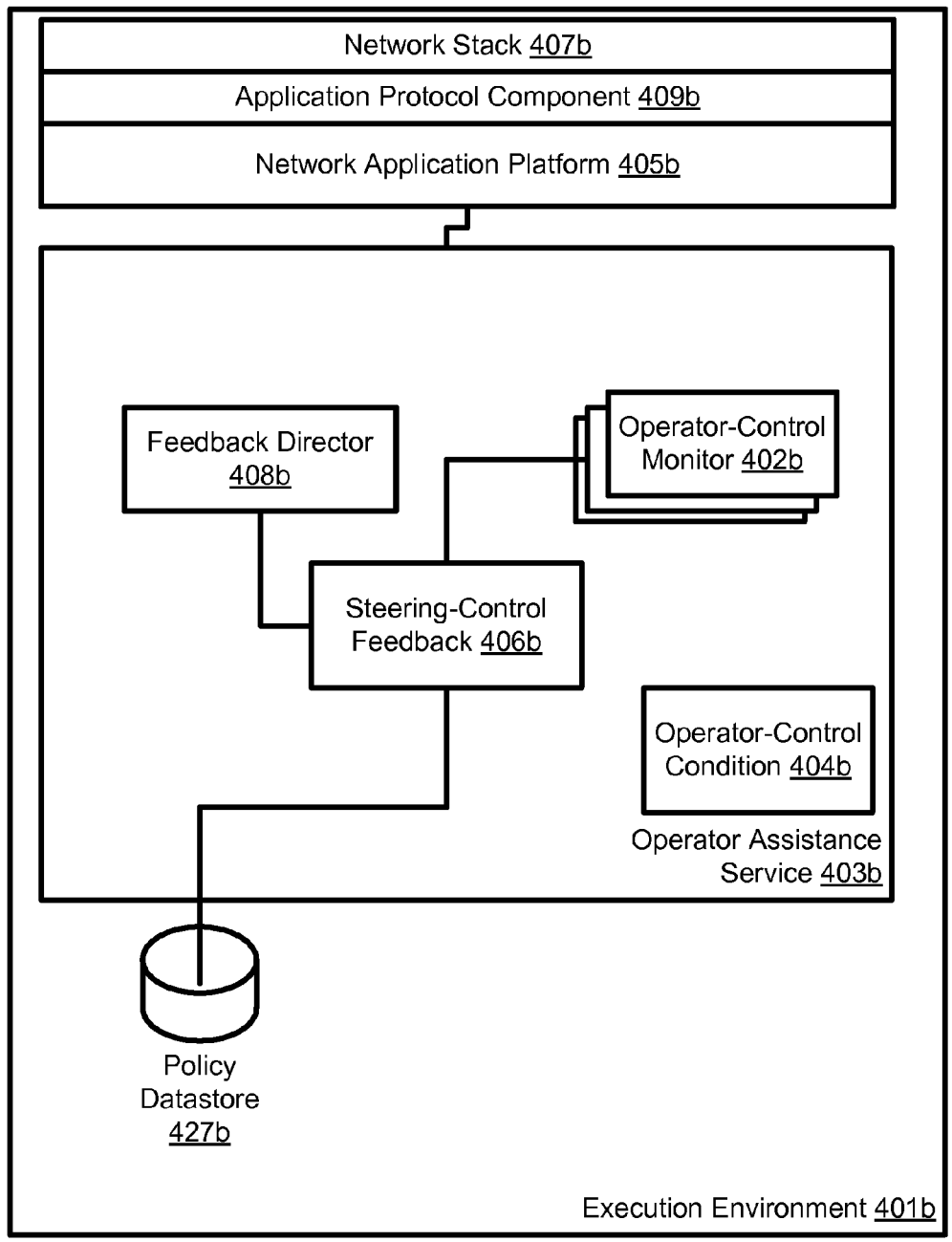
FIG. 4b is a block diagram illustrating an arrangement of components for providing steering-control feedback to an operator of an automotive vehicle according to another aspect of the subject matter described herein.

The block diagram in FIG. 3 illustrates an exemplary system for providing steering-control feedback to an operator of an automotive vehicle according to the method illustrated in FIG. 2. FIG. 3 illustrates a system, adapted for operation in an execution environment, such as execution environment 102 in FIG. 1, for performing the method illustrated in FIG. 2. The system illustrated includes an operator-control monitor component 302, an operator-control condition component 304, a steering-control feedback component 306, and a feedback director component 308. The execution environment includes an instruction-processing unit, such as IPU 104, for processing an instruction in at least one of the operator-control monitor component 302, the operator-control condition component 304, the steering-control feedback component 306, and the feedback director component 308. Some or all of the exemplary components illustrated in FIG. 3 may be adapted for performing the method illustrated in FIG. 2 in a number of execution environments. FIGS. 4a-b are each block diagrams illustrating the components of FIG. 3 and/or analogs of the components of FIG. 3 respectively adapted for operation in execution environment 401a and in execution environment 401b that include or that otherwise are provided by one or more nodes. Components, illustrated in FIG. 4a and FIG. 4b, are identified by numbers with an alphabetic character postfix. Execution environments; such as execution environment 401a, execution environment 401b, and their adaptations and analogs; are referred to herein generically as execution environment 401 or execution environments 401 when describing more than one. Other components identified with an alphabetic postfix may be referred to generically or as a group in a similar manner.

FIG. 1 illustrates key components of an exemplary device that may at least partially provide and/or otherwise be included in an execution environment. The components illustrated in FIG. 4a and FIG. 4b may be included in or otherwise combined with the components of FIG. 1 to create a variety of arrangements of components according to the subject matter described herein.

Figure 5:
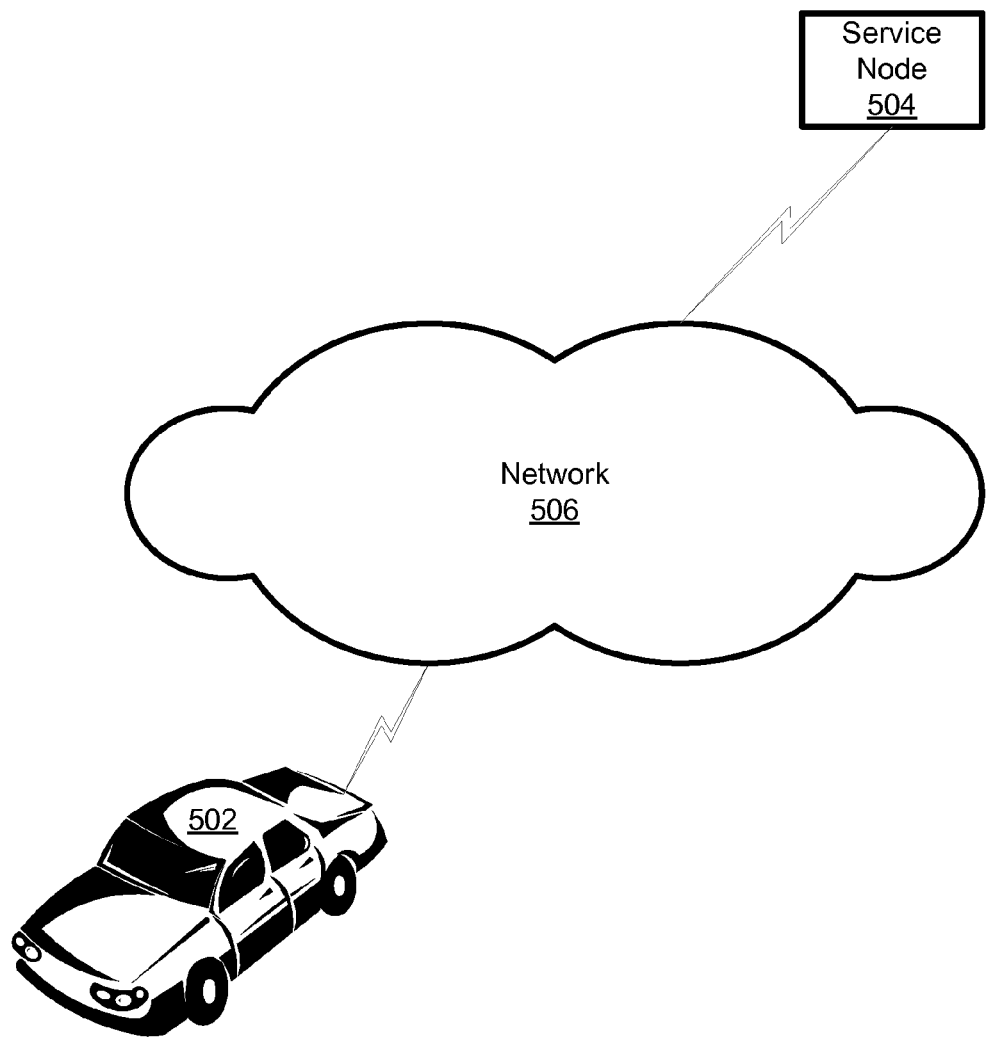
FIG. 5 is a network diagram illustrating an exemplary system for providing steering-control feedback to an operator of an automotive vehicle according to another aspect of the subject matter described herein.

FIG. 4a illustrates an execution environment 401a including an adaptation of the arrangement of components in FIG. 3. In an aspect, execution environment 401a may be included in automotive vehicle 502 illustrated in FIG. 5. FIG. 4b illustrates execution environment 401b configured to host a network accessible application illustrated by operator assistance service 403b. Operator assistance service 403b includes another adaptation or analog of the arrangement of components in FIG. 3. In an aspect, execution environment 401b may include and/or otherwise be provided by service node 504 illustrated in FIG. 5.

FIGS. 4a illustrates execution environment 401a including an adaptation of the arrangement of components in FIG. 3. Some or all of the components in the arrangement may be installed persistently in an execution environment or may be retrieved as needed via a network. In an aspect, some or all of the arrangement of components may be received from operator assistance service 403b operating in execution environment 401b illustrated in FIG. 4b. Various adaptations of the arrangement in FIG. 3 may operate at least partially in execution environment 401a and at least partially in execution environment 401b. FIG. 4b illustrates execution environment 401b configured to host a remote application service illustrated by operator assistance service 403b. Operator assistance service 403b includes another adaptation or analog of the arrangement of components in FIG. 3.

Adaptations and/or analogs of the components illustrated in FIG. 3 may be installed persistently in an execution environment while other adaptations and analogs may be retrieved and/or otherwise received as needed via a network. In an aspect, some or all of the arrangement of components operating in automotive vehicle 502 may be received via network 506. For example, service node 504 may provide some or all of the components. Various adaptations of the arrangement in FIG. 3 may operate at least partially in execution environment 401a and/or at least partially in execution environment 401b. An arrangement of components for performing the method illustrated in FIG. 2 may operate in a single execution environment, in one aspect, and may be distributed across more than one execution environment, in another aspect.

As stated the various adaptations of the arrangement in FIG. 3 are not exhaustive. For example, those skilled in the art will see based on the description herein that arrangements of components for performing the method illustrated in FIG. 2 may be adapted to operate in an automotive vehicle, may be distributed across more than one node in a network including some or all of an automotive vehicle, and/or may be distributed across more than one execution environment.

As described above, FIG. 5 illustrates automotive vehicle 502. An automotive vehicle may include a gas powered, oil powered, bio-fuel powered, solar powered, hydrogen powered, and/or electricity powered car, truck, van, bus, and the like. In an aspect, automotive vehicle 502 may communicate with one or more application providers via a network, illustrated by network 506 in FIG. 5. Service node 504 illustrates one such application provider. Automotive vehicle 502 may communicate with network application platform 405b in FIG. 4c operating in execution environment 401b included in and/or otherwise provided by service node 504. Automotive vehicle 502 and service node 504 may each include a network interface component operatively coupling each respective node to network 506.

FIGS. 4a-b illustrate network stacks 407 configured for sending and receiving data over network 506. Network application platform 405b in FIG. 4b may provide one or more services to operator assistance service 403b. For example, network application platform 405b may include and/or otherwise provide web server functionally on behalf of operator assistance service 403b. FIG. 4b also illustrates network application platform 405b configured for interoperating with network stack 407b providing network services for operator assistance service 403b. Network stack 407a in FIG. 4a serves a role analogous to network stack 407b operating in various adaptations of execution environment 401b.

Network stack 407a and network stack 407b may support the same protocol suite, such as TCP/IP, or may communicate via a network gateway (not shown) or other protocol translation device (not shown) and/or service (not shown). For example, automotive vehicle 502 and service node 504 in FIG. 5 may interoperate via their respective network stacks: network stack 407a in FIG. 4a and network stack 407b in FIG. 4b.

FIGS. 4a-b illustrate application protocol components 409 exemplifying components configured to communicate according to one or more application protocols. Exemplary application protocols include a hypertext transfer protocol (HTTP), a remote procedure call (RPC) protocol, an instant messaging protocol, and/or a presence protocol. Application protocol components 409 in FIGS. 4a-b may support compatible application protocols. Matching protocols enable, for example, one or more components in execution environment 401a supported by automotive vehicle 502 to communicate with one or more components in execution environment 401b of service node 504 via network 506 in FIG. 5. Matching protocols are not required if communication is via a protocol gateway or other protocol translator.

In FIG. 4a, operator assistance subsystem 403a may receive some or all of the arrangement of components in FIG. 4a in one more messages received via network 506 from another node. In an aspect, the one or more message may be sent by operator assistance service 403b via network application platform 405b, network stack 407b, a network interface component, and/or application protocol component 409b in execution environment 401b in FIG. 4b. Operator assistance subsystem 403a may interoperate via one or more of the application protocols provided by application protocol component 409a and/or via a protocol supported by network stack 407a to receive the message or messages including some or all of the components and/or their analogs adapted for operation in execution environment 401a.

One or more UI element handler components 411a are illustrated in presentation controller component 413a in FIG. 4a. UI element handler components 411a and presentation controller component 413a are not shown in FIG. 4b, but those skilled in the art will understand upon reading the description herein that adaptations and/or analogs of these components configured to perform analogous operations may be adapted for operating in execution environment 401b. A presentation controller component 413 may manage the visual, audio, and/or other types of output of an application or executable. FIG. 4a illustrates presentation controller component 413a including one or more UI element handler components 411a for managing one or more types of output for operator assistance subsystem 403a. A presentation controller component and/or a UI element handler component may be configured to receive and route detected user and other inputs to operatively coupled components, as illustrated by operator assistance subsystem 403a.

A UI element handler component 411 in various aspects may be adapted to operate at least partially in a content handler component (not shown) such as a text/html content handler component and/or a script content handler component. One or more content handlers may operate in an application such as a web browser. Additionally or alternatively, a UI element handler component 411 in an execution environment 401 may operate in and/or as an extension of its including application or executable. For example, a plug-in may provide a virtual machine, for a UI element handler component received as a script and/or byte code. The extension may operate in a thread and/or process of an application and/or may operate external to and interoperating with an application.

FIG. 4a illustrates operator assistance subsystem 403a operatively coupled to presentation controller component 413a and one or more UI element handlers 411a included in presentation controller component 413a. Various UI elements of operator assistance subsystem 403a may be presented by one or more UI element handler components 411a. Applications and/or other types of executable components operating in execution environment 401a may also include UI element handler components and/or otherwise interoperate with UI element handler components for presenting user interface elements via one or more output devices, in some aspects.

An execution environment may include a presentation subsystem for presenting one or more types of UI elements, in various aspects. FIG. 4a illustrates presentation subsystem 417a including components for presenting visual outputs. Other types of output may be presented in addition to or instead of visual output, in other aspects. FIG. 4a illustrates presentation subsystem 417a including GUI subsystem 419a. GUI subsystem 419a may present UI elements by instructing corresponding graphics subsystem 421a to draw a UI interface element in a region of a display presentation space, based on presentation information received from a corresponding UI element handler component 411a. Graphics subsystem 421a and a GUI subsystem 419a may be included in presentation subsystem 417a, as illustrated, which may include one or more output devices and/or may otherwise be operatively coupled to one or more output devices.

In some aspects, input may be received and/or otherwise detected via one or more input drivers illustrated by input driver 423a in FIG. 4a. An input may correspond to a UI element presented via an output device. For example, a user may manipulate a pointing device, such as touch screen, to a pointer presented in a display presentation space over a user interface element, representing a selectable operation. A user may provide an input detected by input driver 423a. The detected input may be received by a GUI subsystem 419a via the input driver 423a as an operation or command indicator based on the association of the shared location of the pointer and the operation user interface element. FIG. 4a illustrates that an input driver 423a may receive information for a detected input and may provide information based on the input without presentation subsystem 417a operating as an intermediary. In an aspect, one or more components in operator assistance subsystem 403a may receive input information in response to an input detected by an input driver 423a.

An "interaction", as the term is used herein, refers to any activity including a user and an object where the object is a source of sensory input detected by the user. In an interaction, a user directs attention to an object. An interaction may also include an object as a target of input from a user. The input may be provided intentionally or unintentionally by the user. For example, a rock being held in the hand of a user is a target of input, including tactile input and energy input, from the user. A portable electronic device is a type of object. In another example, a user looking at a portable electronic device is receiving sensory input from the portable electronic device whether the device is presenting an output via an output device or not. The user manipulating an input component of a portable electronic device exemplifies a device, as an input target, receiving input from a user. Note that the user, in providing input, is detecting sensory information from the portable electronic device provided that the user directs sufficient attention to be aware of the sensory information and provided that no disabilities prevent the user from processing the sensory information. An interaction may include an input from the user that is detected and/or otherwise sensed by the device. An interaction may include sensory information that is detected by a user included in the interaction and presented by an output device included in the interaction.

As used herein "interaction information" refers to any information that identifies an interaction and/or otherwise provides data about an interaction between a user and an object. Exemplary interaction information may identify a user input for the object, a user-detectable output presented by an output device of the object, a user-detectable attribute of the object, an operation performed by the object in response to the user, an operation performed by the object to present and/or otherwise produce a user-detectable output, and/or a measure of interaction.

Interaction information for one object may include and/or otherwise identify interaction information for another object. For example, a motion detector may detect an operator's head turn in the direction of a windshield of an automotive vehicle. Interaction information, based on the detected input, may identify the operator's head is facing the windshield. The interaction information may be processed as interaction information for the windshield indicating the operator's is receiving visual input from a viewport provided by some or all of the windshield. The interaction information may be processed to identify a lack of operator interaction with one or more other viewports such as a rear window of the automotive vehicle. Thus the interaction information may serve as interaction information for one or more objects.

The term "occupant" as used herein refers to a passenger of an automotive vehicle. An operator of an automotive vehicle is an occupant of the automotive vehicle. As the terms are used herein, an "operator" of an automotive vehicle, a "driver" of an automotive vehicle, and a "user operating" an automotive vehicle are equivalent.

Vehicle information may include and/or otherwise may identify any information about an automotive vehicle for determining whether the automotive vehicle is operating. For example, vehicle information for an automotive vehicle may include and/or otherwise identify a speed, a rate of acceleration, a thermal property of an operational component, a change in distance to an entity external to the vehicle, an input of an operator detected by the automotive vehicle, and the like. The term "operational component", as used herein, refers to a component of a device included in the operation of a device, such an automotive vehicle.

The term "viewport" as used herein refers to any opening and/or surface of an automotive vehicle that provides a view of a space outside the automotive vehicle. A window, a screen of a display device, a projection from a projection device, and a mirror are all viewports and/or otherwise included in a viewport. A view provided by a viewport may include an object external to the automotive vehicle visible to the operator and/or other occupant. The external object may be an external portion of the automotive vehicle or may be an object that is not part of the automotive vehicle.

With reference to FIG. 2, block 202 illustrates that the method includes receiving first attribute information identifying a first attribute of a first operator coupling of an operator, of an automotive vehicle, to a steering-control mechanism of the automotive vehicle. Accordingly, a system for providing steering-control feedback to an operator of an automotive vehicle includes means for receiving first attribute information identifying a first attribute of a first operator coupling of an operator, of an automotive vehicle, to a steering-control mechanism of the automotive vehicle. For example, as illustrated in FIG. 3, operator-control monitor component 302 is configured for receiving first attribute information identifying a first attribute of a first operator coupling of an operator, of an automotive vehicle, to a steering-control mechanism of the automotive vehicle. FIGS. 4a-b illustrate operator-control monitor components 402 as adaptations and/or analogs of operator-control monitor component 302 in FIG. 3. One or more operator-control monitor components 402 operate in an execution environment 401.

In FIG. 4a, operator-control monitor component 402a is illustrated as a component of operator assistance subsystem 403a. In FIG. 4b, operator-control monitor component 402b is illustrated as a component of operator assistance service 403b. In various aspects, adaptations and analogs of operator-control monitor component 302, in FIG. 3, may detect an attribute of a physical coupling of a user operating an automotive vehicle, such as automotive vehicle 502 in FIG. 5, and a steering-control mechanism of the automotive vehicle, such as a steering wheel. Such a physical coupling is referred to herein as a "steering-control coupling".

The term "operator coupling" as used herein refers to a physical coupling between an operator of an automotive vehicle and any portion of the automotive vehicle and/or an object being transported by the automotive vehicle. For example, an operator pushing a button on a media player, in an automotive vehicle, includes a physical coupling, between the operator and the media player. The media player may be integrated into the automotive vehicle, contained in the automotive vehicle, and/or otherwise transported by the automotive vehicle. A steering-control coupling is a type of operator coupling.

An attribute of an operator coupling, such as a steering-control coupling, may be may be detected by a device for sensing and/or otherwise detecting an input and/or detecting a lack of an input. An attribute of an operator coupling is also referred to herein as an "operator coupling attribute".

A detected input may include and/or otherwise identify attribute information identifying an operator coupling attribute. An operator coupling includes a mechanism-contact surface and an operator-contact surface. A "mechanism-contact surface" includes a whole or a part of a component that is included an automotive vehicle, contained in the automotive vehicle, and/or otherwise transported by the automotive vehicle. A mechanism-contact surface includable in a steering-control coupling is referred to as a "steering-control contact surface". A mechanism-contact surface in an operator coupling is in physical contact with an operator. An operator-contact surface in an operator coupling is in physical contact with a whole or a part of a component in an automotive vehicle, contained in the automotive vehicle, and/or otherwise transported by the automotive vehicle.

An operator coupling may include some or all of an object that couples an operator to a steering-control mechanism, another portion of an automotive vehicle, and/or an object contained in or otherwise transported by an automotive vehicle. Such objects are referred to herein as "coupling objects". Exemplary coupling objects include gloves, steering wheel covers, and prosthetic devices. An operator coupling may be a "null-coupling" with contact surfaces in the coupling having no size. That is, there is no physical coupling in a null-coupling.

An operator may have an operator-contact surface included in a physical coupling to a door handle, an armrest, a display device, a mirror, a media control user interface component, a braking component, and a navigation component, to name a few examples.

In an aspect, a lack of input detected by an operation-control monitor component 402 may indicate a lack of an operator coupling or a null-coupling. In another aspect, a lack of input may indicate a previously detected operator coupling continues to exist unchanged.

Operator-control monitor components 402 in FIG. 4a and/or in FIG. 4b may include and/or otherwise interoperate with a variety of input devices to receive attribute information. In an aspect, a radio dial included in automotive vehicle 502 may receive input from an operator identifying an attribute of an operator coupling including a steering-control contact surface. For example, an operator coupling including a radio dial may indicate that at least one hand of the operator is not included in an operator coupling including the steering-control mechanism. Attribute information may be included and/or otherwise identified in interaction information received by an operator-control monitor component 402 in response to a detected change in operator contact with a mechanism-contact surface.

Operator-control monitor component 402a may receive attribute information in response to the detected radio dial input identifying the attribute of the operator coupling that includes a mechanism-contact surface of automotive vehicle 502. Alternatively or additionally, attribute information may be sent to operator-control monitor component 402b operating in service node 504 via network 506. An operator-control monitor component 402 may include an input device and/or otherwise may be operatively coupled to an input device for receiving attribute information in response to an input detected by the input device.

Alternatively or additionally, an operator-control monitor component 402 in FIG. 4a and/or in FIG. 4b may detect and/or otherwise receive attribute information based on a steering-control contact surface. For example, a sensor in a steering wheel in automotive vehicle 502 may detect an operator's hand contacting the steering wheel or a portion thereof. The sensor may detect a duration of contact, a measure of pressure, a number of contacts in a specified period of time, and/or a pattern of contacts detected over a period of time. The sensor in the steering wheel may include operator-control monitor component 402a, may be included in operator-control monitor component 402a, and/or may be operatively coupled to operator-control monitor component 402a and/or to operator-control monitor component 402b. Attribute information received by and/or from the sensor in the steering wheel may identify and/or may be included in determining and/or otherwise identifying an operator coupling attribute according to a specified metric, for the operator coupling.

An operator-control monitor component 402 may detect and/or otherwise receive attribute information based on other parts of an operator's body. Operator coupling attribute information may be received by operator-control monitor component 402a and/or operator-control monitor component 402b based on an eye, an eyelid, a head, a chest, an abdomen, a back, a leg, a foot, a toe, an arm, a hand, a finger, a neck, skin, and/or hair; or detectable portion of an operators body. An operator-control monitor component 402 may detect and/or otherwise receive operator coupling attribute information identifying for a part or all of an operator a direction of movement, a distance of movement, a pattern of movement, and/or a count of movements.

In an aspect, a heat detector included in a steering-control mechanism in automotive vehicle 502 may detect a difference in heat in portions of the steering-control mechanism to identify a number of mechanism-contact surfaces included in one or more steering-control couplings and/or may detect a change in heat to detect a change from a first mechanism-contact surface to a second mechanism-contact surface. In another aspect, a heat detector may provide or otherwise identify attribute information identifying a rate of change in temperature of a mechanism-contact surface indicating a change in a pressure detected at the mechanism-contact surface. Alternatively or additionally a heat detector may provide input information for determining or otherwise identifying a size of a mechanism-contact surface included in an operator coupling.

An operator's hand movements may be detected. A pattern of movements and/or a rate of change of hand positions may be determined as attributes of one or more operator couplings. One or more of these attributes may be detected via a pressure detector, in some aspects, configured to detect changes in pressure at one or more mechanism-contact surfaces. Operator-control monitor component 402a in FIG. 4a may include and/or otherwise be operatively coupled to a pressure detector. One or more pressure detectors may be included in one or more locations in automotive vehicle 502 for detecting operator couplings to a steering-control mechanism of automotive vehicle 502. Alternatively, one or more pressure detectors may be included in automotive vehicle 502 to detect operator couplings to one or more objects other than the steering-control mechanism. For example, an operator-control monitor may detect an operator coupling to a radio, a glove box, a heating and ventilation control, and/or to another occupant. In another aspect, a pressure detector in automotive vehicle 502 may be communicatively coupled to operator-control monitor component 402b operating in service node 504 via network 506.

An operator-control monitor component 402 in FIG. 4a and/or in FIG. 4b may detect an attribute of a steering-control coupling in automotive vehicle 502 by detecting attribute information identifying for an operator a measure of attention to and/or interaction with a portion of automotive vehicle 502 other than the steering-control mechanism and/or to an object that is not a part of automotive vehicle 502 but may be included in automotive vehicle 502 such as a mobile phone or a personal media player.

Operator-control monitor component 402a may detect or otherwise identify operator coupling attribute information for a first operator coupling to a window open/close control in automotive vehicle 502 identifying an attribute of a steering-control coupling which may be determined to be a null steering-control coupling. A detecting and/or sensing device may be at least partially included in automotive vehicle 502 and/or at least partially on and/or in an operator of automotive vehicle 502. For example, an operator may wear gloves and/or other gear that includes a motion sensing device detecting direction and/or patterns of movement of a hand and/or arm of the operator.

Alternatively or additionally, operator-control monitor component 402 in FIG. 4a and/or in FIG. 4b may include and/or otherwise may communicate with other sensing devices. Operator-control monitor component may interoperate with various types of hand motion sensing devices included in automotive vehicle 502 and/or worn by an operator. Parts of automotive vehicle 502 may detect touch input directly and/or indirectly including depressible buttons, rotatable dials, multi-position switches, and/or touch screens. A seat may be included that detects body direction and/or movement. An armrest may detect contact and thus indicate a hand and/or arm location and/or direction of movement. Automotive vehicle 502 may include one or more microphones for detecting sound and determining a contact surface based on sound. Other sensing devices that may be included in an automotive vehicle, included in an operator, and/or attached to an operator include galvanic skin detectors, detectors of bodily emissions, and detectors of substances taken in by an operator such as alcohol.

FIG. 4b illustrates operator-control monitor component 402b operating external to automotive vehicle 502. Operator-control monitor component 402b operating in service node 504 may receive sensed information about an operator of automotive vehicle 502 via network 506. Operator-control monitor component 402b in FIG. 4b may receive attribute information from one or more of the exemplary sensing devices described above with respect to FIG. 4a. Operator-control monitor component 402b operating in service node 504 may interoperate with one or more automotive vehicles. In an aspect, operator-control monitor component 402b may detect operator coupling attribute information for a first operator coupling in a first automotive vehicle. Operator-control monitor component 402b may similarly detect attribute information of a second operator coupling in a second automotive vehicle. Thus, operator-control monitor component 402b along with other components in the arrangement in FIG. 4b may manage operator couplings in a group of automotive vehicles in a coordinated manner.

Returning to FIG. 2, block 204 illustrates that the method further includes detecting that a specified steering-control criterion is met based on the first attribute. Accordingly, a system for providing steering-control feedback to an operator of an automotive vehicle includes means for detecting that a specified steering-control criterion is met based on the first attribute. For example, as illustrated in FIG. 3, operator-control condition component 304 is configured for detecting that a specified steering-control criterion is met based on the first attribute. FIGS. 4a-b illustrate operator-control condition components 404 as adaptations and/or analogs of operator-control condition component 304 in FIG. 3. One or more operator-control condition components 404 operate in execution environments 401.

In various aspects, adaptations and analogs of operator-control condition component 306, in FIG. 3, may detect and/or otherwise identify a steering-control criterion for evaluation. A steering-control criterion may be tested and/or otherwise evaluated based on an attribute of an operator coupling. A steering-control criterion may be selected and/or otherwise identified from multiple steering-control criteria for testing based on one or more detected attributes of one or more operator couplings. In an aspect, a length of a detected time period of an operator coupling and/or null coupling may be received and/or identified in attribute information. In a further aspect, a steering-control criterion may be located, selected, and/or otherwise identified for evaluation based on the time period. In another aspect, a steering-control criterion may be tested and/or otherwise evaluated based on the detected time period.

A measure of the length of a time period for a steering-control criterion may be provided as input for testing and/or otherwise determining whether the steering-control criterion is met by operator-control condition component 404a in FIG. 4a and/or operator-control condition component 404b in FIG. 4b. A variety of criteria may be tested in a variety of conditions in various aspects. A steering-control criterion may specify a threshold condition for a value for an attribute identified in received attribute information. The attribute may specify a measure of pressure detected for a mechanism-contact surface, a length of time that an operator coupling has existed, and/or a temperature of steering-control contact surface, to name a few examples. In an aspect, operator-control component 404a may determine that the steering-control criterion is met when the attribute identified by the attribute information matches and/or exceeds a threshold condition. A threshold condition specified by a steering-control criterion may be conditioned on information other than an operator coupling attribute. For example, a threshold condition may be based on a particular mechanism-contact surface, an operator coupling with an object other than a steering-control mechanism, a particular operator, a speed of automotive vehicle 502, another automotive vehicle, a geospatial location of automotive vehicle 502, a current time, a day, a month, and/or an ambient condition, to name a few examples.

A steering-control criterion may depend on and/or otherwise may be relative to another criterion and/or relative to an attribute of another operator coupling detectable in and or by an execution environment, such as execution environment 401a. In FIG. 4 an operator-control condition component 404a may test a first steering-control criterion based on a first attribute for a first operator coupling including a first mechanism-contact surface that includes a comparison with a second attribute of a second operator coupling including a mechanism-contact surface. Note that one or both operator couplings may be null couplings. For example, the second attribute may be a size of the second mechanism-contact surface. In FIG. 4b, operator-control condition component 404b may evaluate a first steering-control criterion that is met for a first mechanism-contact surface when a second steering-control criterion for a second mechanism-contact surface is not met. The second mechanism-contact surface may be an acceptable location for an operator's right hand in a steering-control coupling in automotive vehicle 502 and the first mechanism-contact surface may be an acceptable location for the operator's left hand on the steering-control mechanism given that the first steering-control criterion is not met.

Operator-control condition component 404a may receive and/or identify a measure based on a more than one attribute for a steering-control criterion. For example, operator-control condition component 404a may determine a ratio of a first attribute to a second attribute for an operator coupling or for respective operator couplings. A steering-control criterion for steering control coupling may specify that the steering-control criterion is met when a ratio of a first temperature attribute to a second temperature attribute for a mechanism-contact surface in the steering control couplings coupling equals or is below a specified value. For example, a ratio of temperature may indicate a loosening or a tightening an operator's grip in a steering-control coupling based on the specification of a particular steering-control criterion. In an aspect, an automotive vehicle with manual transmission, an operator control condition component 404 may be configured to determine that a particular steering-control criterion is met when the gear shifting hand is not coupled to the steering wheel of the automotive vehicle at least twice the time that the gear shifting hand is coupled to the steering wheel.

In a further example, a steering-control criterion may be based on detecting the occurrence of one or more particular events. For example, operator-control condition component 404b in FIG. 4b may evaluate a steering-control criterion for a measure of pressure on a left-bottom portion of a steering-control mechanism. The steering-control criterion for the left-bottom portion may specify that the steering-control criterion is met only when automotive vehicle 502 is moving in a reverse direction and/or otherwise is in a reverse gear.

Operator-control condition component 404a in FIG. 4a and/or operator-control condition component 404b in FIG. 4b may interoperate with timer components, such as clock component 425a, in FIG. 4a, to set a timer at a particular time with a given duration. The particular time may be identified by configuration information. For example, a timer may be set at regular intervals and/or in response to one or more specified events such as a change in speed and/or direction of an automotive vehicle. A time for setting a timer may be identified in response to receiving operator coupling attribute information identifying an attribute of an operator coupling, such as a steering-control coupling. For example, operator-control monitor component 402a may detect an operator coupling to a seat adjustment control in automotive vehicle 502. In response, operator-control condition component 404a, interoperating with operator-control monitor component 402a, may instruct clock component 425a to start a timer for detecting a time period for a detecting a steering-steering-control criterion. In an aspect, a steering-control criterion may be detected as met in response to detecting a specified time period and/or based on a measure of a length of the time period.

In various aspects, adaptations and analogs of operator-control condition component 304 may detect an expiration of a timer as identifying a time period for a steering-control criterion. A time period may be detected indirectly through detecting the occurrence of other events that bound and/or otherwise identify a start and/or an end of a time period. Time periods may have fixed and/or may have varying durations.

In various aspects, adaptations and analogs of operator-control condition component 304, in FIG. 3, may utilize various measures of time and various components for measuring time. Time may be measured in regular increments as is typical, but may also be measured by the occurrence of events that may be occur irregularly over a given period as compared to the regularity of, for example, a processor clock. For example, time may be measured in distance traveled by automotive vehicle 502, a measure of time may be based on a velocity of automotive vehicle 502, input events detected by one or more components of automotive vehicle 502, and/or time may be measured in terms of a count of operator couplings detected for automotive vehicle 502.

In an aspect, detecting that a steering-control criterion is met may include locating, selecting, and/or otherwise identifying the steering-control criterion for evaluating based on an attribute identified in received attribute information. For example, various input devices may detect various types of attribute information. A steering-criterion may be identified for evaluating based on a type of an attribute. A motion detector may detect a direction of motion, speed of motion, and/or a pattern of motion. An operation-control condition component 404 may identify a steering-control criterion based on a type of attribute required by a steering-control criterion for determining whether the steering-control criterion is met. An appropriate motion-based steering-control criterion may be identified in response to receiving attribute information from the motion detector.

Detecting that a steering-control criterion is met may include detecting when a particular steering-control time period is to be detected and/or otherwise evaluated. For example, a timer may be set to expire every thirty seconds to indicate that a steering-control criterion specifying a threshold condition based on a number of existing steering-control mechanism contacts points is to be tested. In another example, a start of a time period may be detected in response to operator-control monitor component 402b receiving a first attribute of an operator coupling. An end of the time period may be detected in response to operator-control monitor component 402b receiving a subsequent attribute of the operator coupling. Operator-control condition component 404b may measure a length of the time period based on operator-control monitor component 402b receiving the first attribute information and the subsequent attribute information to determine whether a particular steering-control criterion should be evaluated and/or otherwise detected.

Alternatively or additionally, detecting that a steering-control criterion is met may include receiving no interaction information at a point in time and/or for a period of time. Operator-control condition component 404b may be configured to detect that a particular steering-control criterion is met when no change to an operator coupling has been detected for a specified period of time. For example, no interaction between the operator and a particular mechanism-contact surface in a steering-control mechanism may indicate a null coupling has existed for the duration of the time period. The particular steering-control criterion may specify that the criterion is met when an operator coupling including the mechanism-contact surface has been a null coupling for a specified period of time. In another aspect, no interaction at a particular point in time may indicate an unacceptable or dangerous situation. Operator-control condition component 404a may identify a particular steering-control criterion to evaluate when some or all of automotive vehicle 502 is determined to be in an oncoming lane of traffic. The particular steering-control criterion may specify a threshold condition based on a measure of operator grip. A null coupling may indicate a measure of grip that is does not meet the threshold condition. Operator-condition component 404a may be configured to detect that the steering-control criterion is met for a null coupling at the time that some or all of automotive vehicle is detected to be in the oncoming lane of traffic.

In another aspect, a steering-control criterion may b specified based on a time period defined for detecting that a size of a mechanism-contact surface exceeds a threshold identified by the steering-control criterion for particular number of detected size attributes received in the time period and/or based on a measure of time between receiving size attributes in the time period. If no input is detected indicating that the identified threshold has been met during a particular time period, then operator-control monitor component 404*b* may determine that the steering-control criterion has been met.

Alternatively or additionally, determining that a steering-control criterion is met may include detecting an operator coupling to something other than a particular steering-control mechanism-contact surface. In an aspect, the steering-control criterion may be specified based on a particular number of instances of the operator coupling to something other than the steering-control mechanism for a period of time, for a distance travelled, during a turning operation, and the like.

Returning to FIG. 2, block 206 illustrates that the method yet further includes identifying feedback information, based on the steering-control criterion. Accordingly, a system for providing steering-control feedback to an operator of an automotive vehicle includes means for identifying feedback information, based on the steering-control criterion. For example, as illustrated in FIG. 3, steering-control feedback component 306 is configured for identifying feedback information, based on the steering-control criterion. FIGS. 4*a*-*b* illustrate steering-control feedback components 406 as adaptations and/or analogs of steering-control feedback component 306 in FIG. 3. One or more steering-control feedback components 406 operate in execution environments 401.

In various aspects, adaptations and analogs of steering-control feedback component 306, in FIG. 3, may receive and/or otherwise determine feedback information based on a met steering-control criterion. In FIG. 4*a*, operator-control condition component 404*a* may be configured to interoperate with steering-control feedback component 406*a* and/or with steering-control feedback component 406*b* operating in service node 504. The interoperation may be direct and/or indirect. Steering-control feedback component 406*a* may be configured to operate without communication with service node 504. Steering-control feedback component 406*b* may be configured to operate without communication with and/or the presence of steering control component 406*a*. In another aspect, steering control component 406*a* and steering-control component 406*b* may be configured to operate cooperatively in service node 504 in identifying feedback information.

Feedback information may be pre-configured and static. Identifying the feedback information may be in response to determining that a steering-control criterion is met. In another aspect, feedback information may be identified based on a particular attribute of an operator coupling, a particular steering-control criterion determined to be met, a particular operator, a speed of an automotive vehicle, and/or a direction of an automotive vehicle, to name a few examples.

Feedback information may include and/or otherwise identify a suggestion, a warning, an error indication, and/or an emergency indication. For example, a steering-control criterion based on a location of a steering-control contact surface in an operator coupling may be detected as met, by an operator-control condition component 404, when only one hand of an operator is included in an operator coupling. Feedback information for warning the operator may be identified, by a corresponding steering-control feedback component 406, when the speed of the automotive vehicle is below a first threshold. Feedback information for indicating an emergency condition may be identified, by the steering-control feedback component 406, when the speed of the automotive vehicle exceeds a second specified threshold.

In another aspect, feedback information may include and/or otherwise identify an instruction for the operator to perform. For example, a steering-control criterion may be based on an attribute detected for an operator coupling with a mechanism-contact surface of an object other than the steering-control mechanism. The steering-control criterion may be met when the attribute indicates the operator coupling with the other object has existed for at least a specified length of time. In FIG. 4*b*, steering-control feedback component 406*b* may receive information via operator-control condition component 404*b* and/or operator-control condition component 404*a* when the steering-control criterion is met. Steering-control feedback component 406*b* may identify feedback information based on the received information. For example, steering-control feedback component 406*b* may retrieve and/or otherwise identify feedback information via a lookup performed by policy datastore 427*b* based on the received information. The feedback information may identify text, audio, video, and/or animation to instruct the operator to end the operator coupling with the other object and establish a steering-control coupling.

Alternatively or additionally, feedback information may be defined for providing an indication to the operator that the automotive vehicle is automatically performing an operation. The operation may be performed in response to an operator-control component 404 detecting that a particular steering-control criterion is met. For example, steering-control feedback component 404*a* may interoperate with a fuel system, a transmission system, and/or a braking system of automotive vehicle 502 to slow automotive vehicle 502. The feedback information may identify this slowing operation to the operator.

Returning to FIG. 2, block 208 illustrates that the method yet further includes sending, in response to the detecting, the feedback information to present, via an output device, a feedback indicator to the operator. Accordingly, a system for providing steering-control feedback to an operator of an automotive vehicle includes means for sending, in response to the detecting, the feedback information to present, via an output device, a feedback indicator to the operator. For example, as illustrated in FIG. 3, feedback director component 308 is configured for sending, in response to the detecting, the feedback information to present, via an output device, a feedback indicator to the operator. FIGS. 4*a*-*b* illustrate feedback director components 408 as adaptations and/or analogs of feedback director component 308 in FIG. 3. One or more feedback director components 408 operate in execution environments 401.

Feedback information for presenting a user-detectable output, as a feedback indicator, to an operator may be sent via any suitable mechanism including an invocation mechanism, such as a function and/or method call utilizing a stack frame; an interprocess communication mechanism, such as a pipe, a semaphore, a shared data area, and/or a message queue; a register of a hardware component, such as an IPU register; a hardware bus, and/or a network communication, such as an HTTP request and/or an asynchronous message.

In FIG. 4*a*, feedback director component 408*a* may interoperate with UI element handler component 411*a* to seed feedback information for presenting a user-detectable output to attract the attention of an operator of automotive vehicle 502 to a mechanism-contact surface. The feedback information may include and/or may otherwise identify presentation information representing the feedback indicator. The term "feedback indicator", as used herein, refers to a user-detectable output to provide information to an operator related to a steering-control coupling. The steering-control coupling may be a null coupling. UI element handler component 411*a* interoperating with feedback director component 408*a* may send feedback information for presenting the feedback indicator by invoking a component of presentation subsystem 417*a* to interoperate with an output device to present the feedback indicator. presentation subsystem service 417*a* may be operatively coupled to a display, a light, an audio device, a device that moves such as seat vibrator, a device that emits heat, a cooling device, a device that emits an electrical current, a device that emits an odor, and/or another output device that presents an output that may be sensed by an operator.

A feedback indicator may be represented by an attribute of a user interface element. For example, feedback director component 408a may send color information to present a color on a surface of automotive vehicle 502. The surface may provide a mechanism-contact surface and/or may otherwise identify a mechanism-contact surface to an operator. A color may be a feedback indicator for a particular mechanism-contact surface.

Figure 6A:
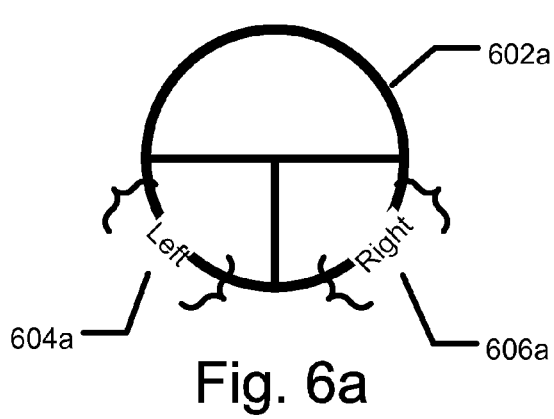
FIG. 6a is a diagram illustrating a user interface presented to a user of an automotive vehicle in another aspect of the subject matter described herein.
Figure 6B:
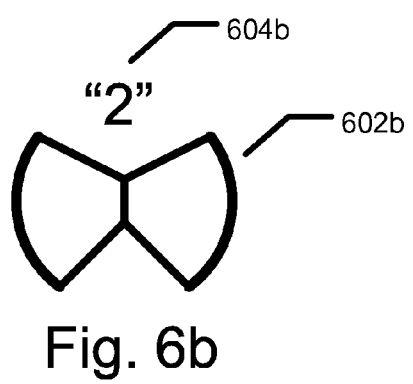
FIG. 6b is a diagram illustrating a user interface presented to a user of an automotive vehicle in another aspect of the subject matter described herein.

FIGS. 6a-d illustrate user interface elements representing steering-control mechanisms 602 accessible to an operator of an automotive vehicle. FIG. 6b illustrates a feedback indicator for instructing an operator to establish two steering-control couplings. That is, FIG. 6b illustrates a feedback indicator 604b defined to instruct the operator to hold a steering-control mechanism with two hands or, at least, to establish two areas of physical contact with the steering-control mechanism represented by user interface element 602b.

FIG. 6a illustrates left feedback indicator 604a and right feedback indicator 606a specified for informing an operator where on a steering wheel represented by user interface element 602a the operator's left and right hands should be coupled to the steering wheel. FIG. 6a illustrates left feedback indicator 604a and right feedback indicator 604b representing mechanism-contact surfaces to be included in a steering-control coupling. A sequence of feedback indicators may provide instruction to an operator of where, when, and/or in what order to establish steering-control couplings. A sequence may be configured to reduce and/or prevent operator fatigue, to enhance operator alertness, and/or to adjust an operator's contact with the steering wheel according to various of driving conditions.

Feedback information representing a feedback indicator for a mechanism-contact surface may include information for changing a border thickness in a border in a user interface element in and/or surrounding some or all of a representation of a mechanism-contact surface and/or a surface providing a mechanism-contact surface. For example, to attract attention to a mechanism-contact surface accessible to an operator's left hand, feedback director component 408b may send feedback information from service node 504 via network 506 to an output device in automotive vehicle 502 to present feedback indicator 604c in FIG. 6c along with a representation of a steering-control mechanism 602c. Feedback indicator 604c is illustrated with a thickness that may be defined to instruct a driver to establish an operator coupling including some or all of a mechanism-contact surface corresponding to feedback indicator 604c. An operator may respond by holding the represented steering-control mechanism along the top portion of the steering wheel with one or both of the operator's hands. A border thickness may be a feedback indicator.

A visual pattern may be presented in and/or on a surface providing a mechanism-contact surface. For example, feedback director component 408b may send a message via network 506 to automotive vehicle 502. The message may include feedback information instructing a presentation device to identify a lower-right portion feedback indicator 604d presented as an arrow in a portion 606d of a representation of a steering wheel 602d. The indicator may alternatively or additionally flash and/or present a pattern of changing colors, lengths, and/or shapes.

In another aspect, a light in a portion of a steering-control mechanism in automotive vehicle 502 and/or a sound emitted by an audio device in and/or on a particular portion of a steering-control mechanism may be configured as a feedback indicator. For example, the light and/or sound may be defined to correspond to the twelve o'clock mechanism-contact surface. The light may be turned on to attract the attention of an operator to the mechanism-contact surface and/or the sound may be output. In another aspect, feedback information may be sent to end an output. For example, feedback director component 408a may be configured to control a power supply for the light to turn off the light to allow a new steering-control coupling to be established at another location.

A user-detectable output to may provide a relative feedback indicator. For example, a feedback indicator may be based on a multi-point scale providing relative indications of a need for an operator's to establish or change a steering-control coupling. For example, a feedback director component 408 may send feedback information for a first feedback indicator representing a number to an operator for a first mechanism-contact surface and a second output may include a second number for a second mechanism-contact surface. A number may be presented to attract the attention of the operator. The size of the numbers may indicate a ranking or order of one mechanism-contact surface over another. For example, if the first number is higher than the second number, the scale may be defined to indicate to the operator that an operator coupling should be established or maintained including the first mechanism-contact surface instead of and/or before establish an operator coupling including the second mechanism-contact surface. The numbers, in another aspect may indicate alternatives indicating a level of suggested preference.

A user interface element, including a feedback indicator, may be presented by a library routine of presentation subsystem 417a. Feedback director component 408b may change a user-detectable attribute of the UI element. For example, feedback director component 408b in service node 504 may send feedback information via network 506 to automotive vehicle 502 for presenting via an output device of automotive vehicle 502. A feedback indicator may include information for presenting a new user interface element and/or to change an attribute of an existing user interface element to present a feedback indicator to an operator.

A region of a surface in automotive vehicle 502 may be designated for presenting a feedback indicator. As described above a region of a surface of automotive vehicle 502 may include a screen of a display device for presenting the some or all of the elements illustrated in FIGS. 6a-d. A position on and/or in a surface of automotive vehicle 502 may be defined for presenting a feedback indicator for a particular mechanism-contact surface provided by the surface or to a mechanism-contact surface otherwise identified by and/or with the position.

A feedback director component 408 in FIG. 4a and/or in FIG. 4b may send feedback information for a feedback indicator that indicates how soon an operator coupling should be established and or changed by an operator. For example, changes in size, location, and/or color may indicate whether a mechanism-contact surface requires attention and may give an indication of how soon a mechanism-contact surface may need attention and/or may indicate a level of attention suggested and/or required. A time indication may give an actual time and/or a relative indication may be presented.

In FIG. 4b, feedback director component 408b in operator assistance service 403b may send feedback information via a response to a request and/or via an asynchronous message to a client, such as automotive vehicle 502 directly and/or indirectly to present a feedback indicator for a mechanism-contact surface provided by automotive vehicle 502.

A mechanism-contact surface may include a presentation device or a portion thereof. Feedback information may be sent to direct the attention of the operator to the mechanism-contact surface via the included presentation device. Feedback director component 408*b* may send feedback information in a message via network 506 to automotive vehicle 502 for presenting a feedback indicator via an output device. The output device may be a projection device for projecting a user interface element as and/or including a feedback indicator on a windshield of automotive vehicle 502 to attract the attention of a driver to a mechanism-contact surface of a steering-control mechanism represented on the windshield. A feedback indicator may be included in and/or may include one or more of an audio interface element, a tactile interface element, a visual interface element, and an olfactory interface element.

Feedback information may include time information identifying a duration for presenting a feedback indicator to an operator. For example, a vehicle may be detected approaching automotive vehicle 502. Feedback indicator may be presented by feedback director component 408*a* in FIG. 4*a* for maintaining two hands at specified, respective mechanism-contact surfaces while the vehicle is approaching. The feedback indicator may be presented for an entire duration of time that the vehicle is approaching automotive vehicle 502, for a longer period, or for a specified portion of the entire duration of the approach.

Figure 6C:
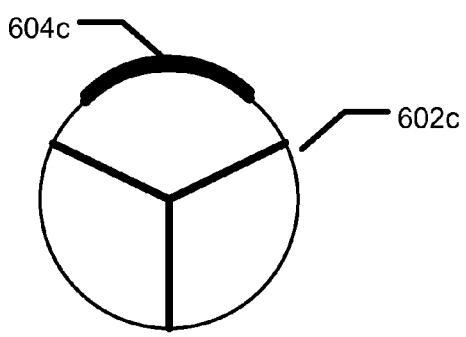
FIG. 6c is a diagram illustrating a user interface presented to a user of an automotive vehicle in another aspect of the subject matter described herein.
Figure 6D:
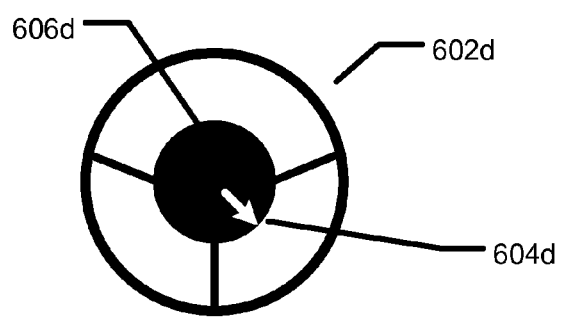
FIG. 6d is a diagram illustrating a user interface presented to a user of an automotive vehicle in another aspect of the subject matter described herein.

A user-detectable attribute and/or element of a presented feedback indicator may be defined to identify a mechanism-contact surface to an operator. For example, in FIG. 6*a* steering wheel UI element 602*a* is illustrated with a "left" feedback indicator 604*a* and a "right" feedback indicator 606*a* to identify locations for operator couplings. FIG. 6*c* illustrates steering-control mechanism UI element 602*c* and a suggested contact surface 604*c* is indicated by a feedback indicator illustrated by an arc over and/or on a top portion of steering-control mechanism UI element 602*c*. A suggested contact surface 604*b* feedback indicator may be defined to identify an area of a steering-control mechanism where one or more operator couplings are required or suggested according to various aspects. FIG. 6*d* illustrates steering-control mechanism UI element 602*d* including a presentation space in central surface 606*d*. Contact surface feedback indicator 604*d* is illustrated by an arrow presented in central surface 606*d* identifying a mechanism-contact surface to be included in an operator coupling.

A steering-control mechanism 602 may include an output device for presenting a feedback indicator. Alternatively or additionally, a feedback indicator may be presented along with a representation, of a steering-control mechanism, presented via an output device.

The method illustrated in FIG. 2 may include additional aspects supported by various adaptations and/or analogs of the arrangement of components in FIG. 3. For example, in various aspects, a steering-control mechanism may include a steering wheel, a tiller, a braking control, a joystick, a touch screen, a pointing device, and a steer-by-wire input device.

Attribute information may be received based on a input detected by at least one of a touch-sensitive input device, pressure-sensitive input device, a chemical detecting input device, a organic compound detecting device, a heat detecting device, a light detecting device, a magnetic force detecting device, a motion detecting device, an image capture device, and/or an audio capture device. The input device may be in the steering-control mechanism, in contact with an external surface of the steering-control mechanism, communicatively coupled to the steering-control mechanism, external to the steering-control mechanism, attached to the operator, in physical contact with the operator without or with clothing included in the contact, communicatively coupled to the first operator, and/or otherwise external to the first operator. Attribute information may include and/or otherwise may be based on interaction information.

Detecting an attribute of a steering-control coupling may include detecting an operator coupling including an operator and a part of an automotive vehicle other than a steering-control mechanism. An operator coupling may be with an electronic device that is not part of automotive vehicle 502. The part may include an audio output component, a video output component, a voice communication component, a data transmission component, a storage compartment, a button, a dial, a toggle, a touch-sensitive input device, a window component, a mirror component, a braking component, an accelerator component, a heating system component, a cooling system component, a cup holder, a component of a door, a component of a seat, and/or an image capture component, to name some examples.

An electronic device included in, but not part of an automotive vehicle may include a handheld device, a wireless device, a mobile phone, a computing device, a media player device, and/or media recording device. Attribute information, in an aspect, may be received via a message from the electronic device via a communications link communicatively coupling the device and the automotive vehicle. The communication link may include a wired physical communications medium and/or a wireless physical communications medium. The communications link may be included in a network. The message may be received via the communication link according to a communication protocol including a universal serial bus (USB) protocol, a serial link protocol, parallel link protocol, and/or a protocol included an IEEE 802 protocol family, to name a few exemplary protocols.

A steering-control coupling may include a first mechanism-contact surface including at least a portion of automotive vehicle 502 in physical contact with a first operator-contact surface including at least a portion of an operator of automotive vehicle 502. An operator-contact surface may include part or all of a hand and/or other body part. The hand and/or other body part may be clothed.

An attribute of an operator coupling may identify and/or be based on a location in an automotive vehicle of a mechanism-contact surface in the operator coupling, a size of the mechanism-contact surface, a relationship between the first mechanism-contact surface and a second mechanism-contact surface, a relationship between the operator coupling and another operator coupling, a duration associated with the operator-coupling, a measure of pressure associated with the operator coupling, and a measure of heat associated with the operator coupling.

An attribute of an operator coupling may be included in an ordered plurality of attributes of one or more operator couplings. Such an ordered plurality may be ordered according time, pressure, size, location, velocity, acceleration, operator-contact surface, and/or mechanism-contact surface, to name some examples. In an aspect, operator-control condition component 404*a* may detect whether steering-control criteria that correspond to the attributes in the plurality are met based on the order.

Detecting that a steering-control criterion is met may include and/or may be included in evaluating a conditional expression, calculating a mathematical function, and/or determining a measure based on a specified metric. An attribute, identified by attribute information, may be an input for the at least one of the evaluating, the calculating, and the determining. In another aspect, identifying feedback information, by an operator-control component, may be based on the evaluating, the calculating, and/or the determining. In still another aspect, a feedback director component 408 may be configured to send feedback information based on the evaluating, the calculating, and/or the determining A metric associated with a steering-control criterion may be predetermined and/or may be identified based on an attribute identified by received attribute information. A metric may include and/or otherwise be based on size, heat, pressure, an amount of a chemical substance, an amount of an organic substance, time, weight, mass, and/or energy, to name some examples. A metric may include and/or otherwise may be based on a rate of change in size, temperature, pressure, an amount of a chemical substance, an amount of an organic substance, time, weight, mass, and/or energy.

Feedback information may include and/or otherwise identify a suggestion, a warning, an error indication, and an emergency indication. Feedback information may include an instruction for an operator of an automotive vehicle to perform. In another aspect, feedback information may include and/or otherwise identify an indication that the automotive vehicle is automatically performing an operation, in response to a detecting that a steering-control criterion is met.

An instruction may include information for establishing an operator coupling, changing an operator coupling including a steering-control mechanism, changing an operator coupling between an operator of an automotive vehicle and an object other than a steering-control mechanism of the automotive vehicle, identifying a sequence of mechanism-contact surfaces to be included in operator couplings, changing a count of mechanism-contact surfaces in an operator coupling, changing a size of a mechanism-contact surface in an operator coupling, identifying a portion of the operator to include in an operator-contact surface in an operator coupling, identifying a portion of the operator to exclude from an operator-contact surface in an operator coupling.

Feedback information may identify and/or otherwise represent audio data, image data, tactile data, and/or olfactory data. Feedback information may be presented via an audio interface element, a tactile interface element, a visual interface element, and/or an olfactory interface element. Feedback information may include and/or otherwise identify time information identifying a length of time for presenting a feedback indicator.

In an aspect, the method illustrated in FIG. 2 may include detecting an event defined for ending the presentation of the feedback indicator, and sending presentation information to stop the presentation of the feedback indicator by the output device. In an aspect, feedback director component 408a may be instructed to send presentation information to end presentation of a feedback indicator in response to a specified, detected event.

In another aspect, a touch screen of a mobile device, such as mobile phone and/or tablet computing device, in automotive vehicle 502 may detect touch input. The driver of automotive vehicle 502 may be logged into the mobile device. The device may include a network interface component such as an 802.11 wireless adapter and/or a BLUETOOTH® adapter. The device may send interaction information to operator-control monitor component 402b in service node 504 via network 506 and/or may send interaction information to operator-control monitor component 402a in FIG. 4a via a personal area network (PAN) and/or a wired connection to automotive vehicle 502.

A feedback indicator may include a change in an attribute of a UI element representing an attribute and/or portion of a steering-control mechanism. Exemplary user interface element attributes that may be changed and/or otherwise presented for a feedback indicator include one or more of a z-order, a level of transparency, a location in a presentation space, a size, and a shape. A location for presenting the feedback indicator may be based on a location of a corresponding mechanism-contact surface.

A feedback indicator may be presented on a steering-control mechanism. In another aspect, a feedback indicator may be provided via a surface not included in and/or on a steering-control mechanism, but that is configured to identify a mechanism-contact surface. FIG. 6a-d illustrate a multiple examples of feedback indicators presentable via presentation subsystem 417a in FIG. 4a by feedback director component 408a in a display in a surface of automotive vehicle 502 rather than or in addition to feedback indicators presented in and/or respective mechanism-contact surfaces.

A feedback indicator may be presented, for example, by feedback director component 408a in FIG. 4a for a specified duration of time and/or until a specified event is detected, and/or may include a pattern of changes presented to an operator of automotive vehicle 502. For example, a feedback indicator may be presented until an operator input is detected that corresponds to the feedback indicator and acknowledges that the operator is aware of the feedback indicator. In response to detecting the operator input, the presentation of the feedback indicator may be removed and/or otherwise stopped. Operator-control monitor component 402a and/or another input handler (not shown) in execution environment 401a may be configured to detect an operator input from an operator acknowledging a feedback indicator.

An attribute of an operator coupling including an operator of an automotive vehicle may be received based on one or more of the operator, a count of occupants in the automotive vehicle, the automotive vehicle, a speed of the automotive vehicle, a mechanism-contact surface included in the operator coupling, a direction of movement of an automotive vehicle, a direction of movement of a portion of the operator, an ambient condition, a topographic attribute of a location including the automotive vehicle, a road, information from a sensor external to the automotive vehicle, and information from a sensor included in the automotive vehicle. For example, topographic information for a location of automotive vehicle 502 may determine a time period and/or steering-control criterion suitable to the topography of the location. A mountainous topography, for example, may be associated with a firm, two-handed grip whereas a flat topography may be associated with a more relaxed and/or even a one handed grip.

Detecting an attribute of an operator coupling and/or determining a steering-control criterion is met may be based on a time period. A time period may be detected based on one or more of an attribute of the operator, a count of occupants in the automotive vehicle, an attribute of the automotive vehicle, a speed of the automotive vehicle, the mechanism-contact surface, a direction of movement of some or all of the operator, an ambient condition, a topographic attribute of a location including the automotive vehicle, a road, information from a sensor external to the automotive vehicle, and information from a sensor included in the automotive vehicle. For example, a length of a time period for detecting an attribute of an operator coupling may be relatively shorter for a relatively older driver beyond a specified age. Shorter time periods may be detected when an automotive vehicle is being driven in rainy weather as opposed to sunny weather. Operator-control condition component 404*a* in FIG. 4*a* and/or operator-control condition component 404*b* in FIG. 4*b* may access an instruction and/or policy for identifying and/or for evaluating whether a steering-control criterion is met based on one or more of the attributes listed in this paragraph as well as other attributes not listed.

As described above, an attribute for a steering-control criterion may be identified based an absolute and/or a relative measure of time. For example, a time period for a steering-control criterion for a first mechanism-contact surface may be based on a second time period for a second steering-control criterion a second mechanism-contact surface.

As described above detecting a time period for a steering-control criterion may include detecting a boundary event identifying one or more of a start, an end, and a time in the time period for a steering-control criterion. Detecting an attribute of operator coupling may include detecting a boundary event. An attribute of operator coupling may identify one or more of a time, in the time period for a steering-control criterion, including one or more of a start time, last detected time, and a time between the start time and the last detected time. Detecting a time period for a steering-control criterion may include detecting a start time and an end time of the time period for a steering-control criterion, wherein one or more of the start time and the end time is detected based on the attribute of operator coupling. Identifying a time period for a steering-control criterion may include measuring some or all of a duration of the time period for a steering-control criterion based on detecting an event in a plurality of events that occur irregularly in time.

Determining that an steering-control criterion is met and/or identifying a steering-control criterion to evaluate may be based on one or more of an attribute of an operator coupling; a mechanism-contact surface; an attribute of an operator such as an age, a measure of physical coordination and/or dexterity of an operator; a measure of sleepiness; a measure of driving aptitude such as a measure of driving experience; a temporal measure; a count of occupants in the automotive vehicle; an attribute of an automotive vehicle such as speed and/or direction of movement; a movement of a steering-control mechanism of an automotive vehicle; an ambient condition, a topographic attribute of a location including an automotive vehicle; a road; information from a sensor external to an automotive vehicle; and information from a sensor included in an automotive vehicle. In FIG. 4*a*, operator-control condition component 404*a* may look locate a specification of a steering-control criterion based on one or more of the attributes listed. Alternatively or additionally, operator-control condition component 404*a* may test a specified steering-control criterion based on one or more of the attributes listed in this paragraph to determine whether the steering-control criterion is met.

Determining that a steering-control criterion is met may include identifying a threshold condition based on an identified attribute of an operator coupling. Identifying a threshold condition may include receiving one or more of the attribute, a generator for determining the attribute, and an input for determining the attribute. A threshold may be identified by one or more of a static value and a value determined dynamically. Determining whether a steering-control criterion is met may include evaluating the steering-control criterion to determine whether an attribute meets a threshold condition specified by the steering-control criterion.

A threshold condition specified by a steering-control criterion may be based on an attribute of an operator coupling, a mechanism-contact surface, an attribute of an operator such as an age, a measure of visual acuity, a measure of sleepiness, a measure of driving aptitude such as a measure of driving experience, a temporal measure, a count of occupants in the automotive vehicle, an attribute of an automotive vehicle such as speed and/or direction of movement, a movement of a steering-control mechanism of an automotive vehicle, an ambient condition, a topographic attribute of a location including an automotive vehicle, a road, information from a sensor external to an automotive vehicle, and information from a sensor included in an automotive vehicle. For example, a threshold condition specified by a steering-control criterion specified for inclement weather may be different that a threshold condition specified for the steering-control mechanism in relatively better weather conditions. One or more thresholds and/or threshold conditions may be stored in a policy data store 423 and accessed by an operator-control condition component 404 to determine whether a steering-control criterion is met. A threshold and/or a threshold condition may be specified based on user input and/or may be received via a network from a remote node.

Determining that a steering-control criterion is met may include evaluating the steering-control criterion by comparing an first steering control attribute for a first operator coupling a second attribute for the same and/or a second operator coupling. For example, steering-control feedback component 406*a* may be configured to detect a percentage of a time period an operator is coupled to two or more steering-control mechanism-contact surfaces. The time period may vary based on the operator, road conditions, and/or other attributes for which examples have been provided above.

A steering-control mechanism in an automotive vehicle may include a plurality of mechanism-contact surfaces. Sending feedback information may be based on one or more of a last mechanism-contact surface included in an operator coupling, a specified order of the mechanism-contact surfaces in the plurality, a speed of the automotive vehicle, a geospatial location of the automotive vehicle, a direction of movement of the automotive vehicle, an object, a specified destination, a location of the automotive vehicle in a specified route, an ambient condition, an attribute of an operator, a count of users in the automotive vehicle, an attribute of a cargo included in the automotive vehicle, an attribute of sound detectable in the automotive vehicle, and an attribute of a road.

To the accomplishment of the foregoing and related ends, the descriptions herein and the referenced figures set forth certain illustrative aspects and/or implementations of the subject matter described. These are indicative of but a few of the various ways the subject matter may be employed. The other aspects, advantages, and novel features of the subject matter will become apparent from the detailed description included herein when considered in conjunction with the referenced figures.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more instruction-processing units, or by a combination of both. The description herein of any sequence of actions is not intended to imply that the specific order described for performing that sequence must be followed.

Moreover, the methods described herein may be embodied in executable instructions stored in a computer-readable medium for use by or in connection with an instruction execution machine, system, apparatus, or device, such as a computer-based or processor-containing machine, system, apparatus, or device. As used here, a "computer-readable medium" may include one or more of any suitable media for storing the executable instructions of a computer program in one or more of an electronic, magnetic, optical, electromagnetic, and infrared form, such that the instruction execution machine, system, apparatus, or device may read (or fetch) the instructions from the computer-readable medium and execute the instructions for carrying out the described methods. A non-exhaustive list of conventional exemplary computer-readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), and a Blu-ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

I claim:

1. A method for providing steering-control feedback to an operator of an automotive vehicle, the method comprising:
    receiving first attribute information identifying a first attribute of a first operator coupling of an operator, of an automotive vehicle, to a steering-control mechanism of the automotive vehicle;
    detecting that a specified steering-control criterion is met based on the first attribute;
    identifying feedback information, based on the steering-control criterion; and
    sending, in response to the detecting, the feedback information to present, via an output device, a feedback indicator to the operator.

2. The method of claim 1 wherein the steering-control mechanism includes at least one of a steering wheel, a tiller, a braking control, a joystick, a touch screen, a pointing device, and a steer-by-wire input device.

3. The method of claim 1 wherein the first attribute information is received based on an input detected by at least one of a touch sensitive input device, pressure sensitive input device, a chemical detecting input device, an organic compound detecting device, a heat detecting device, a light detecting device, a magnetic force detecting device, a motion detecting device, an image capture device, and an audio capture device.

4. The method of claim 3 wherein at least a portion of the input device is at least one of included in the steering-control mechanism, in contact with an external surface of the steering-control mechanism, communicatively coupled to the steering-control mechanism, external to the steering-control mechanism, attached to the operator, in physical contact with the operator, communicatively coupled to the operator, and external to the operator.

5. The method of claim 1 wherein detecting the first attribute of the first operator coupling includes detecting a second operator coupling of the operator to at least one of a first portion of the automotive vehicle other than the steering-control mechanism and an electronic device that is not part of the automotive vehicle.

6. The method of claim 5 wherein the electronic device includes at least one of a handheld device, a wireless device, a mobile phone, a computing device, a media player device, and a media recording device.

7. The method of claim 5 wherein receiving the first attribute information includes receiving a message from the electronic device via a physical communications link.

8. The method of claim 1 wherein the first operator coupling includes a first mechanism-contact surface including at least a portion of the automotive vehicle in physical contact with an operator-contact surface including at least a portion of the operator.

9. The method of claim 8 wherein first attribute is based on a location in the automotive vehicle of the first mechanism-contact surface, a size of the first mechanism-contact surface, a relationship between the first mechanism-contact surface and a second mechanism-contact surface, a relationship between the first operator coupling and a second operator coupling, a duration of the first operator coupling, a measure of pressure associated with the first operator coupling, and a measure of heat associated with the first operator coupling.

10. The method of claim 8 wherein the first attribute is included in an ordered plurality of steering-control attributes.

11. The method of claim 10 wherein the ordered plurality is ordered according to at least one of time, pressure, size, location, velocity, acceleration, operator-contact surface, and mechanism-contact surface.

12. The method of claim 10 wherein the ordered plurality includes a second attribute of one of the first operator coupling and a second operator coupling.

13. The method of claim 1 wherein the feedback information includes at least one of a suggestion, a warning, an error indication, and an emergency indication.

14. The method of claim 1 wherein the feedback information includes at least one of an instruction for the operator to perform and an indication that the automotive vehicle is automatically performing, in response to detecting that the steering-control criterion is met, an operation.

15. The method of claim 14 wherein the instruction includes information for at least one of establishing a mechanism-contact surface, changing a mechanism-contact surface, changing a second operator coupling between the operator and an object other than the steering-control mechanism, identifying a sequence of mechanism-contact surfaces to be established, changing a count of mechanism-contact surfaces, changing a size of a mechanism-contact surface, identifying a portion of the operator to include in an operator contact location, and identifying a portion of the operator to exclude from an operator contact location.

16. The method of claim 1 wherein at least a portion of the feedback information is received in message via a network.

17. The method of claim 16 wherein the message is received from at least one of an electronic device in the automotive vehicle that is not part of the automotive vehicle and a remote node operatively coupled to the automotive vehicle via a network.

18. The method of claim 1 wherein the method further comprises: detecting an event defined for ending the presentation of the feedback indicator; and sending presentation information to stop the presentation of the feedback indicator by the output device.

19. The method of claim 1 wherein the specified steering-control criterion takes into account at least four of: a movement of a steering wheel, a receipt of user input via a control interface, a movement of a brake control, a temperature of the operator, an ambient temperature of the automotive vehicle, a movement of a head of the operator, a movement of at least one eye or eyelid of the operator, a road on which the automotive vehicle travels, a topography, a speed associated with the automotive vehicle, an acceleration associated with the automotive vehicle, and whether the automotive vehicle is determined to be in an oncoming lane of traffic.

20. The method of claim 1 wherein the specified steering-control criterion takes into account at least five of: a movement of a steering wheel, a receipt of user input via a control interface, a movement of a brake control, a temperature of the operator, an ambient temperature of the automotive vehicle, a movement of a head of the operator, a movement of at least one eye or eyelid of the operator, a road on which the automotive vehicle travels, a topography, a speed associated with the automotive vehicle, an acceleration associated with the automotive vehicle, and whether the automotive vehicle is determined to be in an oncoming lane of traffic.

21. The method of claim 1 wherein the specified steering-control criterion takes into account at least six of: a movement of a steering wheel, a receipt of user input via a control interface, a movement of a brake control, a temperature of the operator, an ambient temperature of the automotive vehicle, a movement of a head of the operator, a movement of at least one eye or eyelid of the operator, a road on which the automotive vehicle travels, a topography, a speed associated with the automotive vehicle, an acceleration associated with the automotive vehicle, and whether the automotive vehicle is determined to be in an oncoming lane of traffic.

22. The method of claim 1 wherein the specified steering-control criterion takes into account at least seven of: a movement of a steering wheel, a receipt of user input via a control interface, a movement of a brake control, a temperature of the operator, an ambient temperature of the automotive vehicle, a movement of a head of the operator, a movement of at least one eye or eyelid of the operator, a road on which the automotive vehicle travels, a topography, a speed associated with the automotive vehicle, an acceleration associated with the automotive vehicle, and whether the automotive vehicle is determined to be in an oncoming lane of traffic.

23. The method of claim 1 wherein the specified steering-control criterion takes into account at least ten of: a movement of a steering wheel, a receipt of user input via a control interface, a movement of a brake control, a temperature of the operator, an ambient temperature of the automotive vehicle, a movement of a head of the operator, a movement of at least one eye or eyelid of the operator, a road on which the automotive vehicle travels, a topography, a speed associated with the automotive vehicle, an acceleration associated with the automotive vehicle, and whether the automotive vehicle is determined to be in an oncoming lane of traffic.

24. An apparatus, comprising:
at least one vehicular component configured for:
receiving first attribute information identifying a first attribute of a first operator coupling of an operator, of an automotive vehicle, to a steering-control mechanism of the automotive vehicle;
detecting that a specified steering-control criterion is met based on the first attribute;
identifying feedback information, based on the steering-control criterion; and
in response to the detecting, performing an operation for preventing at least one output via an output device and providing visual feedback information that indicates that the automotive vehicle is performing the operation for preventing the at least one output via the output device.

25. The apparatus of claim 24 wherein the apparatus is operable such that the steering-control mechanism includes a touch screen.

26. The apparatus of claim 24 wherein the apparatus is operable such that the steering-control mechanism includes a control mechanism.

27. The apparatus of claim 24 wherein the apparatus is operable such that the output device includes a light.

28. The apparatus of claim 24 wherein the apparatus is operable such that the at least one output includes a function associated with a mobile device.

29. The apparatus of claim 24 wherein the apparatus is operable such that the at least one output is prevented to reduce a distraction to the operator.

30. The apparatus of claim 24 wherein the apparatus is operable such that the at least one output is prevented as a function of at least four of: a movement of a steering wheel, a receipt of user input via a control interface, a movement of a brake control, a temperature of the operator, an ambient temperature of the automotive vehicle, a movement of a head of the operator, a movement of at least one eye or eyelid of the operator, a road on which the automotive vehicle travels, a topography, a speed associated with the automotive vehicle, an acceleration associated with the automotive vehicle, and whether the automotive vehicle is determined to be in an oncoming lane of traffic.

31. The apparatus of claim 24 wherein the apparatus is operable such that the at least one output is prevented as a function of at least five of: a movement of a steering wheel, a receipt of user input via a control interface, a movement of a brake control, a temperature of the operator, an ambient temperature of the automotive vehicle, a movement of a head of the operator, a movement of at least one eye or eyelid of the operator, a road on which the automotive vehicle travels, a topography, a speed associated with the automotive vehicle, an acceleration associated with the automotive vehicle, and whether the automotive vehicle is determined to be in an oncoming lane of traffic.

32. The apparatus of claim 24 wherein the apparatus is operable such that the at least one output is prevented as a function of at least six of: a movement of a steering wheel, a receipt of user input via a control interface, a movement of a brake control, a temperature of the operator, an ambient temperature of the automotive vehicle, a movement of a head of the operator, a movement of at least one eye or eyelid of the operator, a road on which the automotive vehicle travels, a topography, a speed associated with the automotive vehicle, an acceleration associated with the automotive vehicle, and whether the automotive vehicle is determined to be in an oncoming lane of traffic.

33. The apparatus of claim 24 wherein the apparatus is operable such that the at least one output is prevented as a function of at least seven of: a movement of a steering wheel, a receipt of user input via a control interface, a movement of a brake control, a temperature of the operator, an ambient temperature of the automotive vehicle, a movement of a head of the operator, a movement of at least one eye or eyelid of the operator, a road on which the automotive vehicle travels, a topography, a speed associated with the automotive vehicle, an acceleration associated with the automotive vehicle, and whether the automotive vehicle is determined to be in an oncoming lane of traffic.

34. The apparatus of claim 24 wherein the apparatus is operable such that the at least one output is prevented as a function of at least ten of: a movement of a steering wheel, a receipt of user input via a control interface, a movement of a brake control, a temperature of the operator, an ambient temperature of the automotive vehicle, a movement of a head of the operator, a movement of at least one eye or eyelid of the operator, a road on which the automotive vehicle travels, a topography, a speed associated with the automotive vehicle, an acceleration associated with the automotive vehicle, and whether the automotive vehicle is determined to be in an oncoming lane of traffic.

35. An apparatus, comprising:
at least one vehicular component configured for:
receiving first attribute information identifying a first attribute of a first operator coupling of an operator, of an automotive vehicle, to a steering-control mechanism of the automotive vehicle;
detecting that a specified steering-control criterion is met based on the first attribute;
identifying feedback information, based on the steering-control criterion; and
sending, in response to the detecting, the feedback information to present, via an output device, a feedback indicator to the operator;
wherein the apparatus is operable such that the specified steering-control criterion takes into account at least three of: a receipt of user input via a control interface, a temperature of the operator, an ambient temperature of the automotive vehicle, a road on which the automotive vehicle travels, and a topography.

36. The apparatus of claim 35 wherein the apparatus is operable such that the specified steering-control criterion takes into account at least four of: a receipt of user input via a control interface, a temperature of the operator, an ambient temperature of the automotive vehicle, and a road on which the automotive vehicle travels, and a topography.

37. The apparatus of claim 35 wherein the apparatus is operable such that the specified steering-control criterion takes into account all of: a receipt of user input via a control interface, a temperature of the operator, an ambient temperature of the automotive vehicle, and a road on which the automotive vehicle travels, and a topography.

* * * * *